(12) United States Patent
Homma et al.

(10) Patent No.: US 10,298,878 B2
(45) Date of Patent: May 21, 2019

(54) TERMINAL, COMMUNICATION METHOD, AND RECORDING MEDIUM STORING PROGRAM

(71) Applicants: Takeshi Homma, Kanagawa (JP); Takashi Hasegawa, Kanagawa (JP)

(72) Inventors: Takeshi Homma, Kanagawa (JP); Takashi Hasegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/218,427

(22) Filed: Jul. 25, 2016

(65) Prior Publication Data

US 2017/0034476 A1 Feb. 2, 2017

(30) Foreign Application Priority Data

Jul. 28, 2015 (JP) ................................ 2015-148990

(51) Int. Cl.
*H04N 7/14* (2006.01)
*H04W 4/80* (2018.01)
(Continued)

(52) U.S. Cl.
CPC ........... *H04N 7/147* (2013.01); *H04L 65/403* (2013.01); *H04L 67/04* (2013.01); *H04L 67/12* (2013.01);
(Continued)

(58) Field of Classification Search
USPC ........................................... 348/14.01–14.09
See application file for complete search history.

(56) References Cited

U.S. PATENT DOCUMENTS

2010/0312897 A1* 12/2010 Allen .................. H04L 12/1822
709/227
2014/0101727 A1 4/2014 Okuyama et al.

FOREIGN PATENT DOCUMENTS

JP 2003-303170 10/2003
JP 2007-068119 3/2007
(Continued)

OTHER PUBLICATIONS

Extended European Search Report dated Dec. 1, 2016 in Patent Application No. 16180618.7.
(Continued)

*Primary Examiner* — Maria El-Zoobi
(74) *Attorney, Agent, or Firm* — Oblon, McClelland, Maier & Neustadt, L.L.P.

(57) ABSTRACT

A communication terminal, a method of communication, and a computer-readable non-transitory recording medium storing a program for causing a computer to execute the method. The communication terminal and the method includes outputting terminal identification information identifying a communication terminal, receiving external terminal identification information identifying an external communication terminal, the external terminal identification information being sent from the external communication terminal through a communication management system to a destination address of the communication terminal indicated by the terminal identification information, and transmitting, when requesting to start communication with a counterpart communication terminal, the received external terminal identification information to the communication management system, instead of the terminal identification information of the communication terminal.

20 Claims, 25 Drawing Sheets

(51) Int. Cl.
*H04L 29/06* (2006.01)
*H04L 29/08* (2006.01)
*H04M 1/2755* (2006.01)
*H04N 7/15* (2006.01)

(52) U.S. Cl.
CPC .......... *H04L 67/146* (2013.01); *H04L 67/148* (2013.01); *H04L 67/20* (2013.01); *H04L 67/38* (2013.01); *H04M 1/2755* (2013.01); *H04N 7/15* (2013.01); *H04W 4/80* (2018.02)

(56) References Cited

FOREIGN PATENT DOCUMENTS

| | | |
|---|---|---|
| JP | 2012-178135 | 9/2012 |
| JP | 2013-093776 | 5/2013 |
| JP | 2014-075074 | 4/2014 |
| WO | WO 2014/063739 A1 | 5/2014 |

OTHER PUBLICATIONS

U.S. Appl. No. 15/376,957, filed Dec. 13, 2016, Takashi Hasegawa, et al.

\* cited by examiner

FIG. 9

AUTHENTICATION
MANAGEMENT TABLE

| TERMINAL ID | PASSWORD |
|---|---|
| 01aa | aaaa |
| 01ab | abab |
| 01ba | baba |
| ... | ... |

FIG. 10

TERMINAL MANAGEMENT TABLE

| TERMINAL ID | NAME OF DESTINATION ADDRESS | OPERATING STATUS | RECEIVED DATE AND TIME | IP ADDRESS OF TERMINAL |
|---|---|---|---|---|
| 01aa | AA TERMINAL, TOKYO OFFICE, JAPAN | ONLINE | 2015.4.10.13:40 | 1.2.1.3 |
| 01ab | AB, TOKYO OFFICE, JAPAN | ONLINE (COMMUNICATION ESTABLISHED) | 2015.4.09.12:00 | 1.2.1.4 |
| 01ac | AC, TOKYO OFFICE, JAPAN | OFFLINE | 2015.4.09.12:30 | 1.2.1.5 |
| ... | ... | ... | ... | ... |
| 01ba | BA TERMINAL, BEIJING OFFICE, CHINA | ONLINE | 2015.4.10.13:45 | 1.2.2.3 |
| 01bb | BB, BEIJING OFFICE, CHINA | ONLINE (TEMPORARILY ABSENT) | 2015.4.10.13:50 | 1.2.2.4 |
| ... | ... | ... | ... | ... |
| 01ca | CA TERMINAL, WASHINGTON D. C. OFFICE, U.S. | OFFLINE | 2015.4.10.12:45 | 1.3.1.3 |
| 01cb | CB, WASHINGTON D. C. OFFICE, U.S. | ONLINE (COMMUNICATION ESTABLISHED) | 2015.4.10.13:55 | 1.3.1.4 |
| ... | ... | ... | ... | ... |
| 01da | DA TERMINAL, BERLIN OFFICE, EUROPE | ONLINE (COMMUNICATION ESTABLISHED) | 2015.4.08.12:45 | 1.3.2.3 |
| 07db | DB, BERLIN OFFICE, EUROPE | ONLINE | 2015.4.10.12:45 | 1.3.2.4 |
| ... | ... | ... | ... | ... |

FIG. 11

CONTACT LIST MANAGEMENT TABLE

| STARTING TERMINAL ID | COUNTERPART TERMINAL ID |
|---|---|
| 01aa | 01ab, ···, 01ba, 01bb, ···, 01ca, 01cb, 01da, 01db, ··· |
| 01ab | 01aa, 01ca, 01cb, 01da |
| ··· | ··· |
| 01ba | 01aa, 01ab, 01ca, 01cb, 01da, 01db |
| ··· | ··· |
| 01da | 01aa, 01ab, 01ba, ···, 01da, 01ca, 01cb, ···, 01db |

FIG. 12

SESSION MANAGEMENT TABLE

| SESSION ID | RELAY DEVICE ID | STARTING TERMINAL ID | COUNTERPART TERMINAL ID | DELAY TIME | DELAY INFORMATION RECEIVED DATE AND TIME,, |
|---|---|---|---|---|---|
| se01 | 111a | 01aa | 01db | 200 | 2015.4.10.13:41 |
| se02 | 111a | 01ba | 01cb | 50 | 2015.4.10.12:01 |
| ... | ... | ... | ... | ... | ... |

FIG. 13

COMMUNICATION INFORMATION MANAGEMENT TABLE

| COMMUNICATION ID | DELAY DEVICE IP ADDRESS | TERMINAL ID OF COMMUNICATING TERMINALS |
|---|---|---|
| co01 | 1.2.1.2 | 01ab, 01da |
| co02 | 1.2.2.1 | 01ba, 01cc |
| ... | ... | ... |

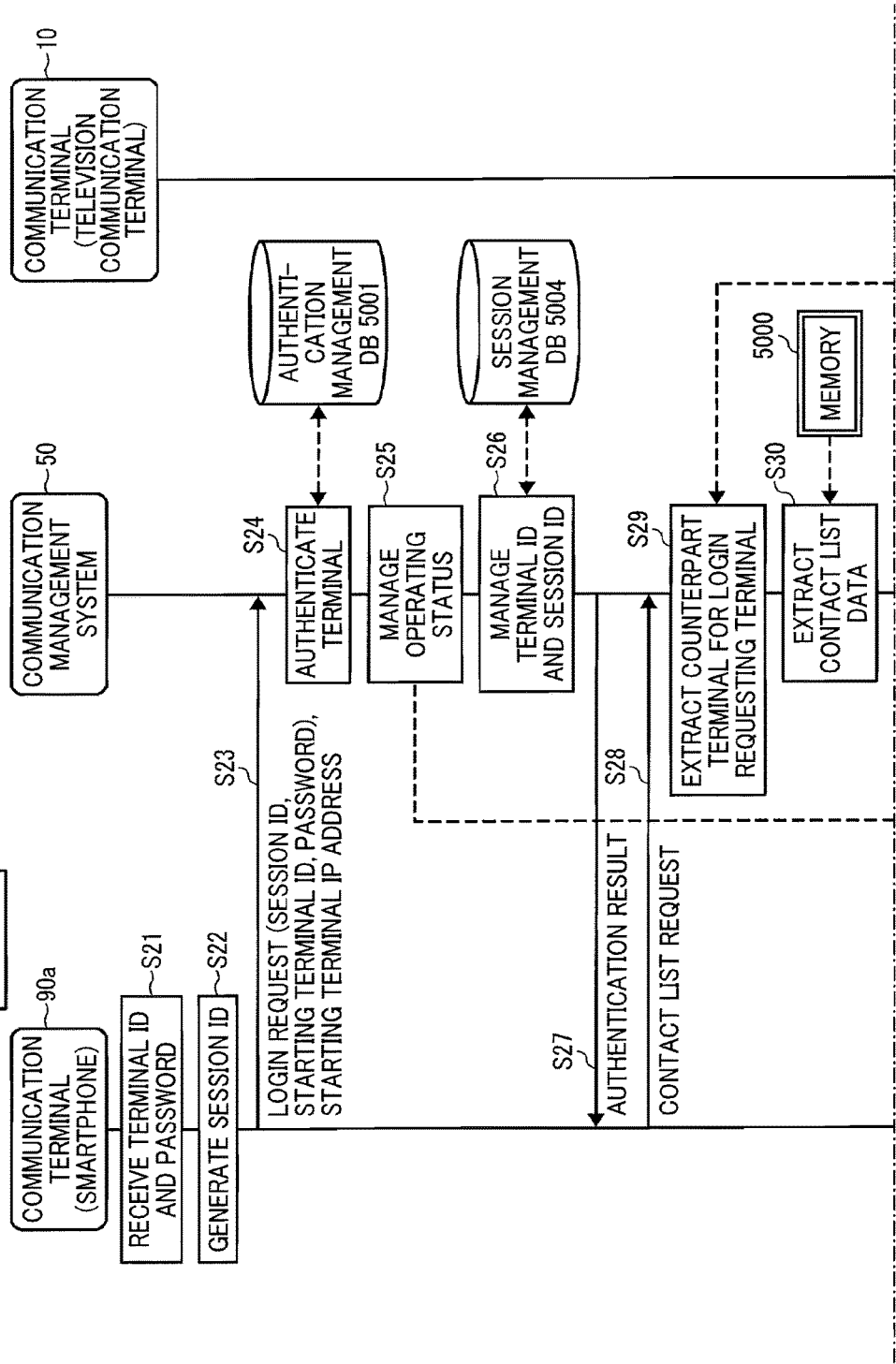

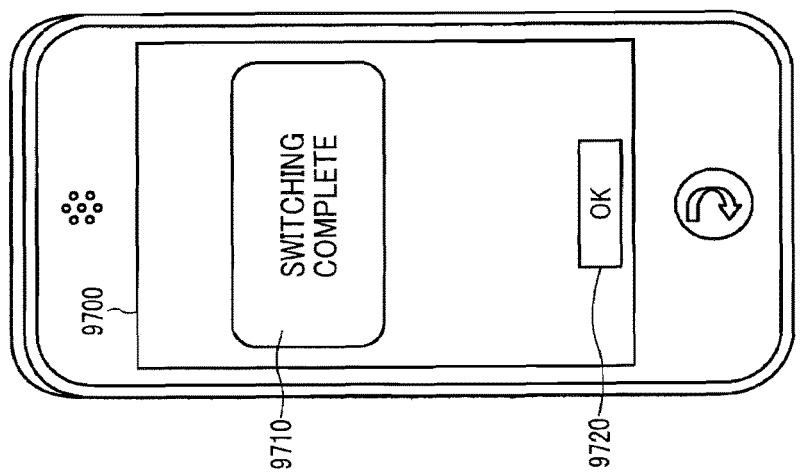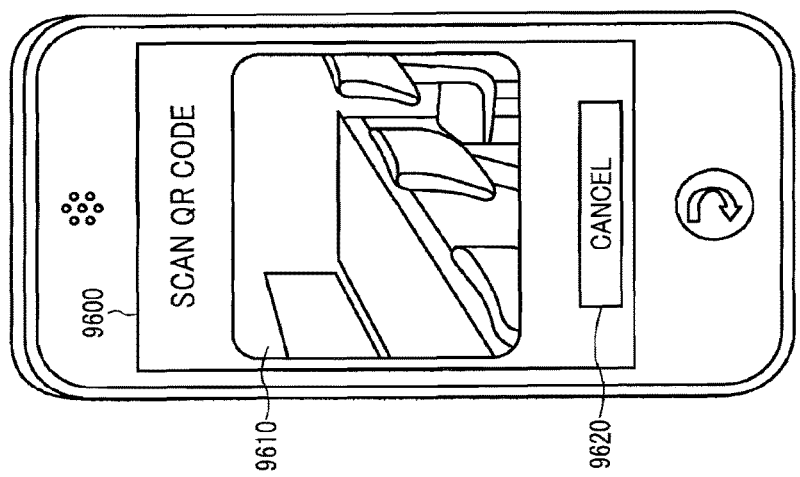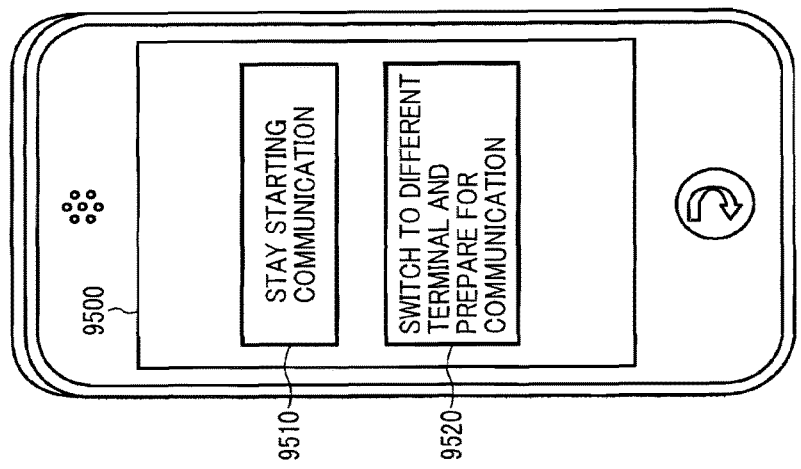

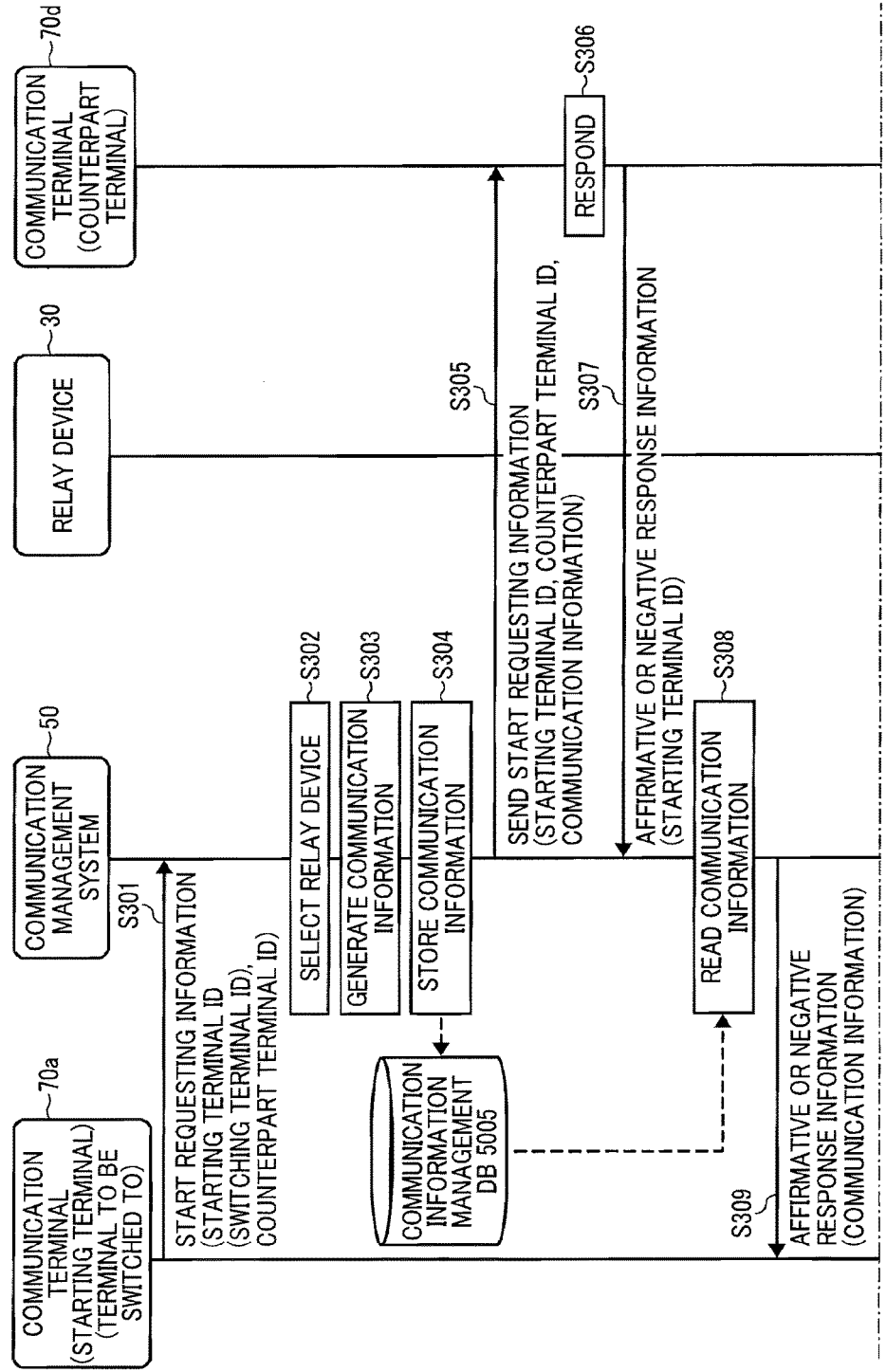

FIG. 22A

| STATUS | TERMINAL ID | CONTACT NAME |
|---|---|---|
| 📞 | 01aa | AA TERMINAL, TOKYO OFFICE, JAPAN |
| 📞 | 01ab | AB, TOKYO OFFICE, JAPAN |
| ⋮ | | |
| 📞 | 01db | DB, BERLIN OFFICE, EUROPE |
| QR CODE ~1110 | | |

FIG. 22B

| STATUS | TERMINAL ID | CONTACT NAME |
|---|---|---|
| 📞 | 01aa | AA TERMINAL, TOKYO OFFICE, JAPAN |
| ☎ | 01ab | AB, TOKYO OFFICE, JAPAN |
| ⋮ | | |
| 📞 | 01db | DB, BERLIN OFFICE, EUROPE |
| QR CODE ~1110 | | |

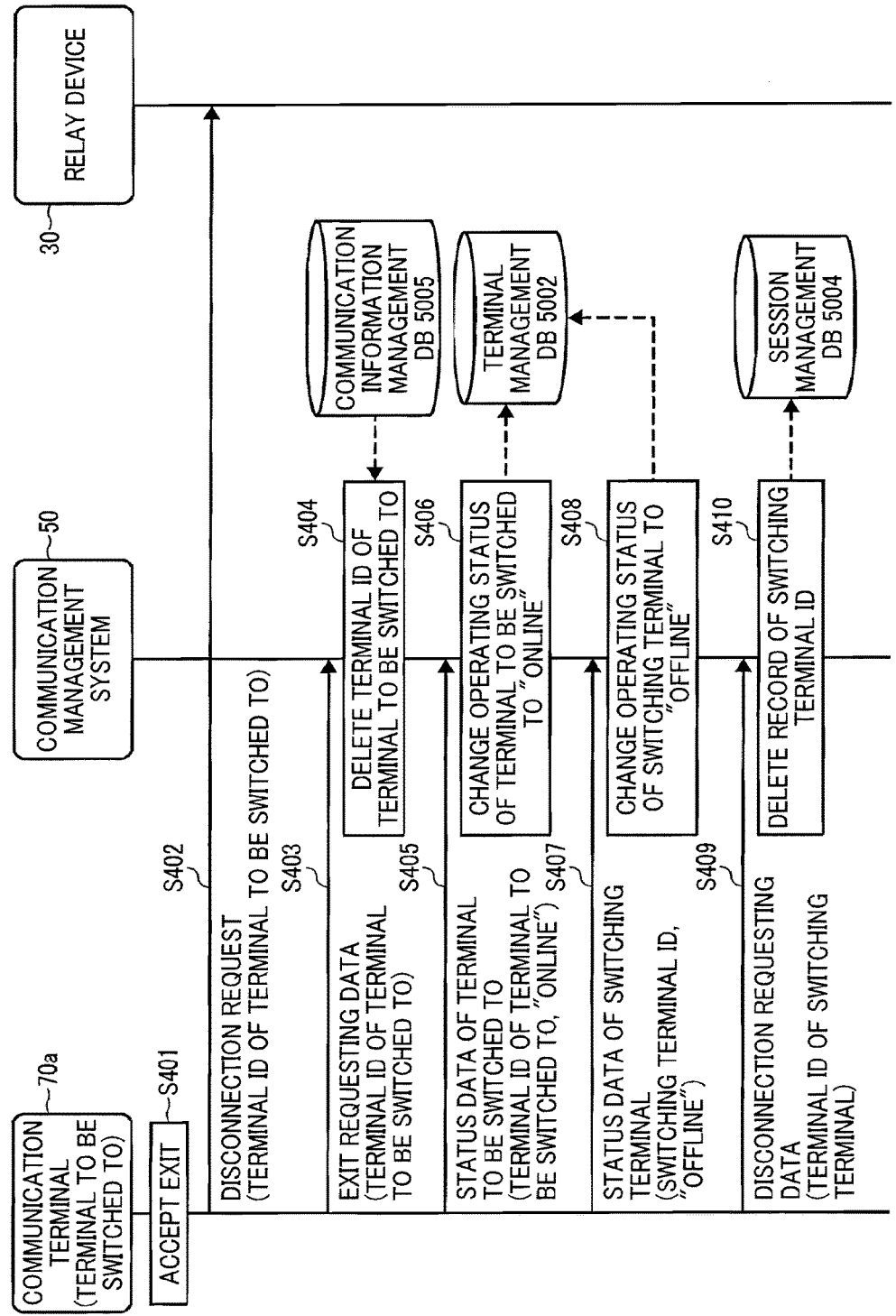

TERMINAL, COMMUNICATION METHOD, AND RECORDING MEDIUM STORING PROGRAM

CROSS-REFERENCE TO RELATED APPLICATION

This patent application is based on and claims priority pursuant to 35 U.S.C. § 119(a) to Japanese Patent Application No. 2015-148990, filed on Jul. 28, 2015, in the Japan Patent Office, the entire disclosure of which is hereby incorporated by reference herein.

BACKGROUND

Technical Field

Embodiments of the present invention relate to a terminal, a communication method, and a recording medium storing a program.

Background Art

With the increased need for reducing the cost of business trip and the time spent for the business trip, video conference systems for arranging a video conference among a plurality of sites are now widely used. The video conference systems directly transmit or receive image data and audio data among a plurality of communication terminals such as video conference terminals.

Mobile stations such as smartphones are relatively smaller than the video conference terminals, and are usually carried by a user. For this reason, the user can easily perform operations such as the selection of a counterpart terminal by using his/her mobile station.

SUMMARY

Embodiments of the present invention described herein provide a communication terminal, a method of communication, and a computer-readable non-transitory recording medium storing a program for causing a computer to execute the method. The communication terminal and the method includes outputting terminal identification information identifying a communication terminal, receiving external terminal identification information identifying an external communication terminal, the external terminal identification information being sent from the external communication terminal through a communication management system to a destination address of the communication terminal indicated by the terminal identification information, and transmitting, when requesting to start communication with a counterpart communication terminal, the received external terminal identification information to the communication management system, instead of the terminal identification information of the communication terminal.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 9 is a diagram illustrating an example data structure of an authentication management table, according to an embodiment of the present invention.

FIG. 10 is a diagram illustrating an example data structure of a terminal management table, according to an embodiment of the present invention.

FIG. 11 is a diagram illustrating an example data structure of a contact list management table, according to an embodiment of the present invention.

FIG. 12 is a diagram illustrating a session management table according to an embodiment of the present invention.

FIG. 13 is a diagram illustrating a communication information management table according to an embodiment of the present invention.

FIG. 14A and FIG. 14B are a data sequence diagram illustrating the operation of preparing for communication between the communication terminals of the communication system of FIG. 1, according to an embodiment of the present invention.

FIG. 17A, FIG. 17B, and FIG. 17C are diagrams illustrating examples of the screen of a mobile station when the mobile station communicates with another terminal, according to an embodiment of the present invention.

FIG. 20A and FIG. 20B are a sequence diagram illustrating how telecommunication starts among terminals, according to an embodiment of the present invention.

FIG. 22A and FIG. 22B each illustrates an example of a contact list displayed on a communication terminal 10, according to an embodiment of the present invention.

FIG. 23 is a sequence diagram illustrating the processes of terminating telecommunication, according to an embodiment of the present invention.

Figure 1:
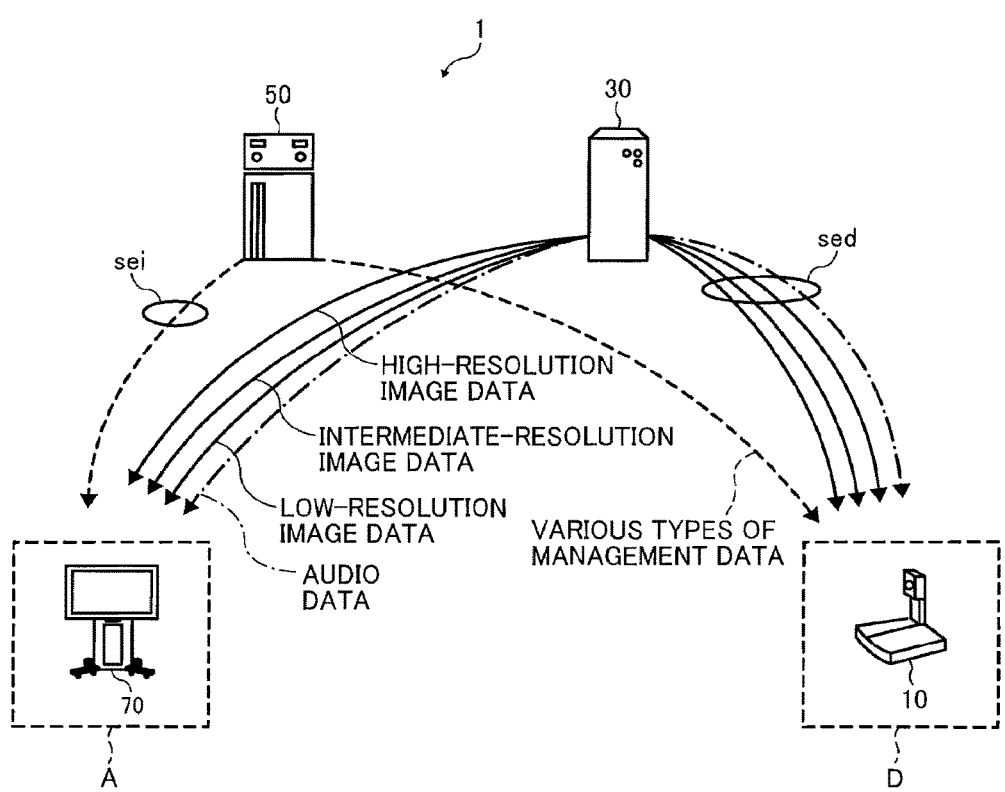
FIG. 1 is a schematic diagram illustrating a part of a communication system relating to video conference communication, according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following description, an embodiment of the present invention is described with reference to the drawings.

<<Schematic Configuration of Communication System>>

Firstly, a communication system 1 that performs a video conference between a plurality of communication terminals 10 and 70 is described with reference to FIG. 1. FIG. 1 is a schematic diagram illustrating the communication of the video conference performed by the communication system according to an embodiment of the present invention.

Note that the "video conference" may also be referred to as a "television (TV) conference". Here, the video conference is described by way of example, but such a video conference may just be a simple conversation.

The communication system 1 includes the multiple communication terminals 10 and 70, a relay device 30, and a communication management system 50. The communication terminals 10 and 70 transmit and receive image data and audio data that are an example of the contents of data. In FIG. 1, a video conference terminal is depicted as an example of the communication terminal 10, and an electronic whiteboard is depicted as an example of the communication terminal 70. Note that image data may be a video image or a still image or both of the video image and the still image.

The communication terminal that serves as a requesting terminal that requests the startup of a video conference is referred to as a "starting terminal", and the communication terminal that serves as a destination (relaying destination) of the request is referred to as a "counterpart terminal". In FIG. 1, the communication terminal 70 and the communication terminal 10 are referred to as a starting terminal and a counterpart terminal, respectively. However, when the communication terminal 10 requests to start a video conference with the communication terminal 70, the communication terminal 10 serves as a starting terminal, and the communication terminal 70 serves as a counterpart terminal. Note that the communication terminals 10 and 70 may be used not only for communication between different offices or for communication between different rooms in the same office, but also for communication within the same room or for outdoor-indoor communication or outdoor-outdoor communication.

The relay device 30 relays contents of data among a plurality of communication terminals 10 and 70. The communication management system 50 collectively manages the login authentication of the communication terminals 10 and 70, the communication status of the communication terminals 10 and 70, a contact list, the communication status of the relay device 30, or the like. The relay devices 30 and the communication management system 50 according to the present embodiment may be configured by a single computer or a plurality of computers to which functions are allocated as desired in a divided manner.

In the communication system 1, a management information session sei for sending and receiving various kinds of management information is established between the starting terminal and the counterpart terminal via the communication management system 50. Moreover, the four sessions of sending and receiving the four kinds of data including high-resolution image data, medium-resolution image data, low-resolution image data, and audio data are established between the starting terminal and the counterpart terminal via the relay device 30. In FIG. 1, these four sessions are collectively referred to as an image and audio data session sed. The image and audio data session "sed" does not necessarily include four sessions, but may include any number of sessions greater than or less than four. Alternatively, a communication session may directly be established between a starting terminal and a counterpart terminal without the relay device 30.

Here, the resolution of image data used in the present embodiment is described. The low-resolution image data serves as a base image, and has, for example, horizontal 160 pixels by vertical 120 pixels. The intermediate-resolution image data has, for example, horizontal 320 pixels by vertical 240 pixels. The high-resolution image data has, for example, horizontal 640 pixels by vertical 480 pixels. In the case of a narrow band path, low-quality image data that only includes low-resolution image data serving as a base image is relayed. In the case of a relatively wide band path, intermediate-quality image data including low-resolution image data serving as a base image and intermediate-resolution image data is relayed. In the case of a very wide band path, high-quality image data including low-resolution image data serving as a base image, intermediate-resolution image data, and high-resolution image data is relayed. As audio data has a relatively small data size compared with image data, such audio data is relayed even in the case of a narrow band path.

<<Hardware Configuration According to Present Embodiment>>

Next, the hardware configuration according to the present embodiment is described.

<<Hardware Configuration of Video Conference Terminal>>

Figure 2:
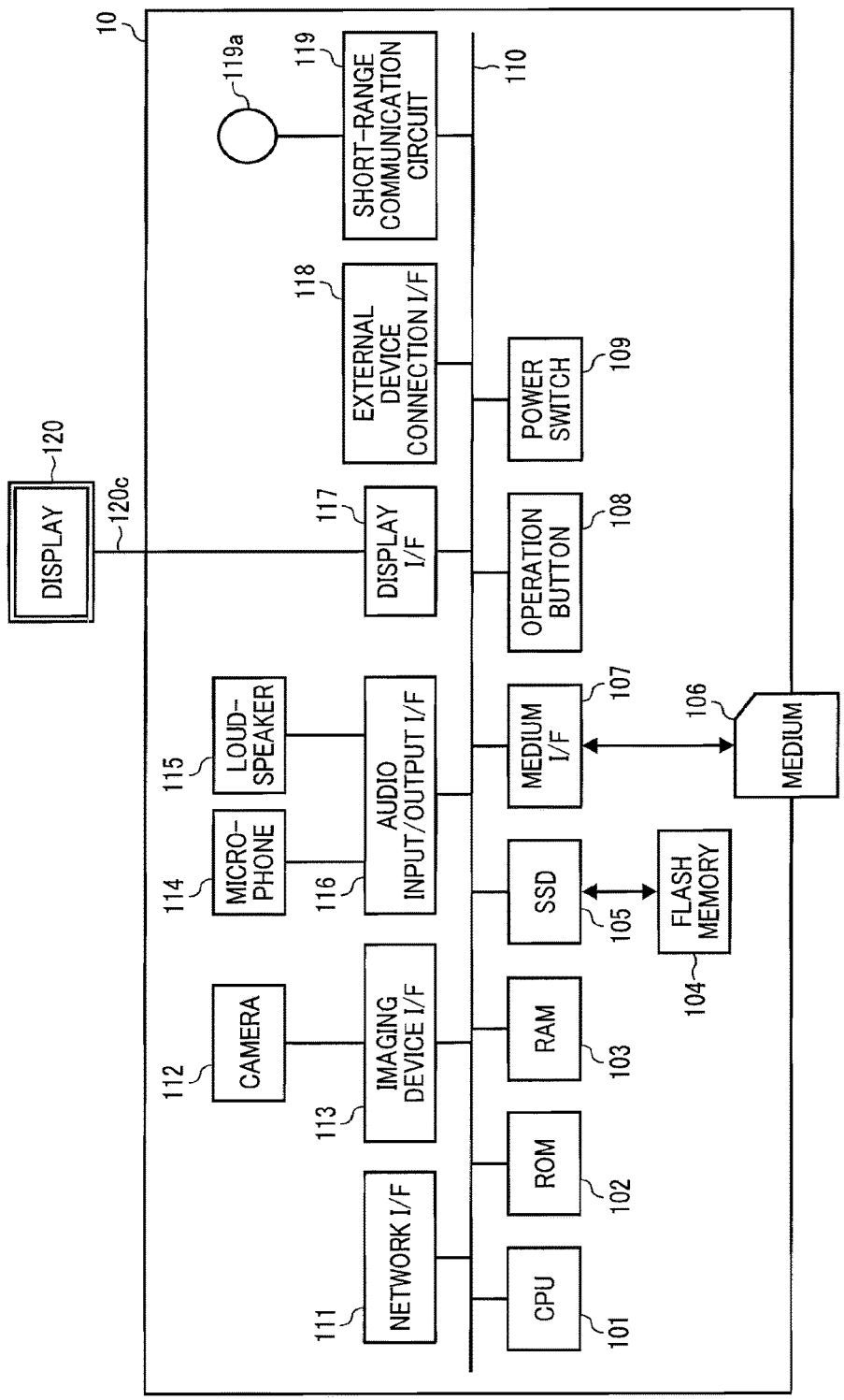
FIG. 2 is a schematic block diagram illustrating a hardware configuration of a video conference terminal according to an embodiment of the present invention.

FIG. 2 is a schematic block diagram illustrating the hardware configuration of a video conference terminal according to the present embodiment. As illustrated in FIG. 2, the video conference terminal, which is given as an example of the communication terminal 10 according to the present embodiment, includes a central processing unit (CPU) 101, a read only memory (ROM) 102, a random access memory (RAM) 103, a flash memory 104, a solid state disk (SSD) 105, a media interface (I/F) 107, an operation key 108, a power switch 109, a bus line 110, a network interface (I/F) 111, a camera 112, an imaging device interface (I/F) 113, a microphone 114, a loudspeaker 115, an audio input and output interface (I/F) 116, a display interface (I/F) 117, an external device connection interface (I/F) 118, a short-range communication circuit 119, and an antenna 119a of the short-range communication circuit 119. The CPU 101 controls the overall operation of the communication terminal 10. The ROM 102 stores a control program used for operating the CPU 101 such as an Initial Program Loader (IPL). The RAM 103 is mainly used as a work area in which the CPU 101 executes a program. The flash memory 104 stores various kinds of data such as a communication control program, image data, and audio data. The SSD 105 controls reading or writing of various kinds of data to or from the flash memory 104 under the control of the CPU 101. Note that a hard disk drive (HDD) may be used instead of the SSD. The medium I/F 107 controls reading or writing of data with respect to a recording medium 106 such as a flash memory. The operation key 108 is operated by a user to input a user instruction such as a user selection of a destination of the communication terminal 10. The power switch 109 turns on or off the power of the communication terminal 10.

The network I/F 111 allows communication of data with an external device through a communication network 4 such as the Internet. The camera 112 is an example of imaging device that captures a subject under control of the CPU 101 to obtain the image data of the subject, and may be incorporated in the communication terminal. The imaging device I/F 113 is a circuit that controls the driving of the camera 112. The microphone 114 is an example of a built-in sound collector capable of inputting audio under the control of the CPU 101. The audio input and output (input/output) interface (I/F) 116 is a circuit for inputting or outputting an audio signal between the microphone 114 and the loudspeaker 115 under the control of the CPU 101. The display interface (I/F) 117 is a circuit that sends the image data to an external display 120 according to the control made by the CPU 101. The external device connection I/F 118 is an interface circuit that connects the communication terminal 10 to various kinds of external devices. The short-range communication circuit 119 is a communication circuit that communicates in compliance with, for example, a near-field communication (NFC; Registered Trademark) or Bluetooth (Registered Trademark).

The bus line 110 is, for example, an address bus or a data bus, which electrically connects various elements such as the CPU 101 illustrated in FIG. 2.

The display 120 may be a liquid crystal or organic electroluminescence (EL) display that displays an image of a subject, an operation icon, or the like. The display 120 is connected to the display interface (IF) 117 via a cable 120c. The cable 120c may be an analog red green blue (RGB) (video graphic array (VGA)) signal cable, a component video cable, a high-definition multimedia interface (HDMI, registered trademark) signal cable, or a digital video interactive (DVI) signal cable.

The camera 112 includes a lens and a solid-state image sensing device that converts an image (video) of a subject to electronic data by converting light to electric charge. As the solid-state image sensing device, for example, a complementary metal-oxide-semiconductor (CMOS) or a charge-coupled device (CCD) is used. The external device connection I/F 118 is capable of connecting an external device such as an external camera, an external microphone, or an external loudspeaker through a Universal Serial Bus (USB) cable or the like. In the case where an external camera is connected, the external camera is driven in preference to the built-in camera 112 under the control of the CPU 101. Similarly, in the case where an external microphone is connected or an external loudspeaker is connected, the external microphone or the external loudspeaker is driven in preference to the built-in microphone 114 or the built-in loudspeaker 115 under control of the CPU 101.

The recording medium 106 is removable from the communication terminal 10. In addition, a nonvolatile memory that reads or writes data under control of the CPU 101 is not limited to the flash memory 104, and an electrically erasable and programmable read-only memory (EEPROM) may be used instead.

<Hardware Configuration of Communication Management System and Relay Device>

Figure 3:
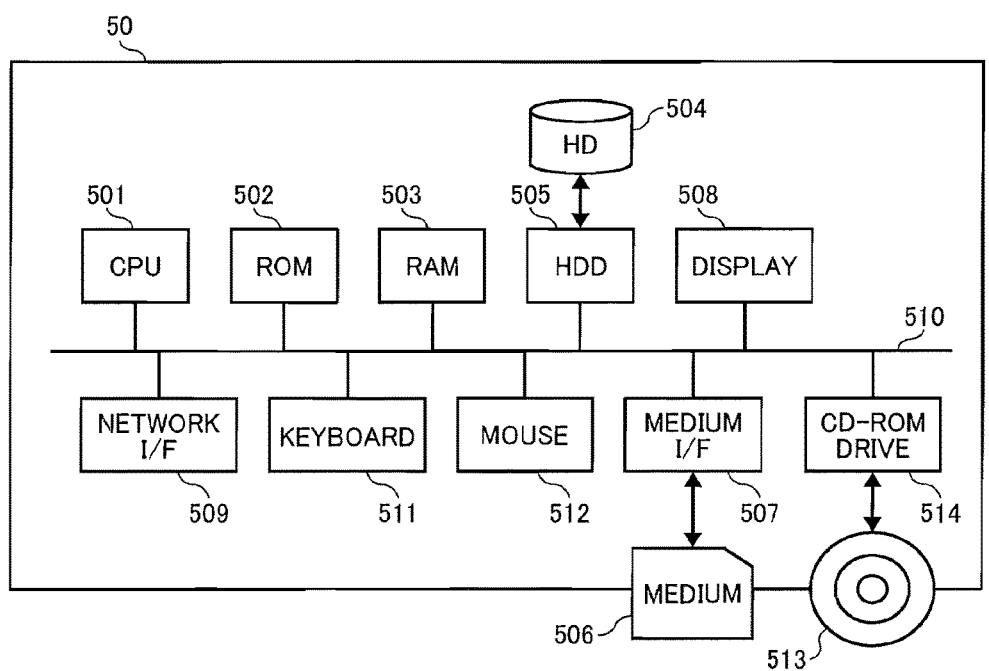
FIG. 3 is a schematic block diagram illustrating a hardware configuration of a communication management system and the relay device according to an embodiment of the present invention.

FIG. 3 is a schematic block diagram illustrating the hardware configuration of the communication management system 50 and the relay device 30 according to the present embodiment. A server computer, which is an example of the communication management system 50, includes a CPU 501, a ROM 502, a RAM 503, a hard disk (HD) 504, a hard disk drive (HDD) 505, a recording medium 506, a medium interface (I/F) 507, a display 508, a network interface (I/F) 509, a keyboard 511, a mouse 512, a compact disc read only memory (CD-ROM) drive 514, and a bus line 510.

The CPU 501 controls entire operation of the communication management system 50.

The ROM 502 stores a control program for controlling the CPU 501 such as an IPL. The RAM 503 is used as a work area for the CPU 501. The HD 504 stores various data such as the communication management program. The HDD 505 controls reading or writing of various data to or from the HDD 504 under control of the CPU 501. The medium I/F 507 controls reading or writing of data with respect to a recording medium 506 such as a flash memory. The display 508 displays various information such as a cursor, menu, window, characters, or image. The network I/F 509 is an interface for communicating data with an external device through the communication network 4 such as the Internet. The keyboard 511 is one example of input device provided with a plurality of keys for allowing a user to input characters, numerals, or various instructions. The mouse 512 is one example of input device for allowing the user to select a specific instruction or execution, select a target for processing, or move a cursor being displayed. The CD-ROM drive 514 reads or writes various data with respect to a CD-ROM 513, which is one example of removable recording medium.

The bus line 510 is, for example, an address bus or a data bus, which electrically connects various elements such as the CPU 501 illustrated in FIG. 3.

Note that the hardware configuration of the relay device 30 illustrated in FIG. 1 is similar to that of the communication management system 50, and thus the description of the hardware configuration of the relay device 30 is omitted. However, the relay device 30 stores a relay control program in the HD 504 in alternative to the management program.

<<Hardware Configuration of Electronic Whiteboard>>

Figure 4:
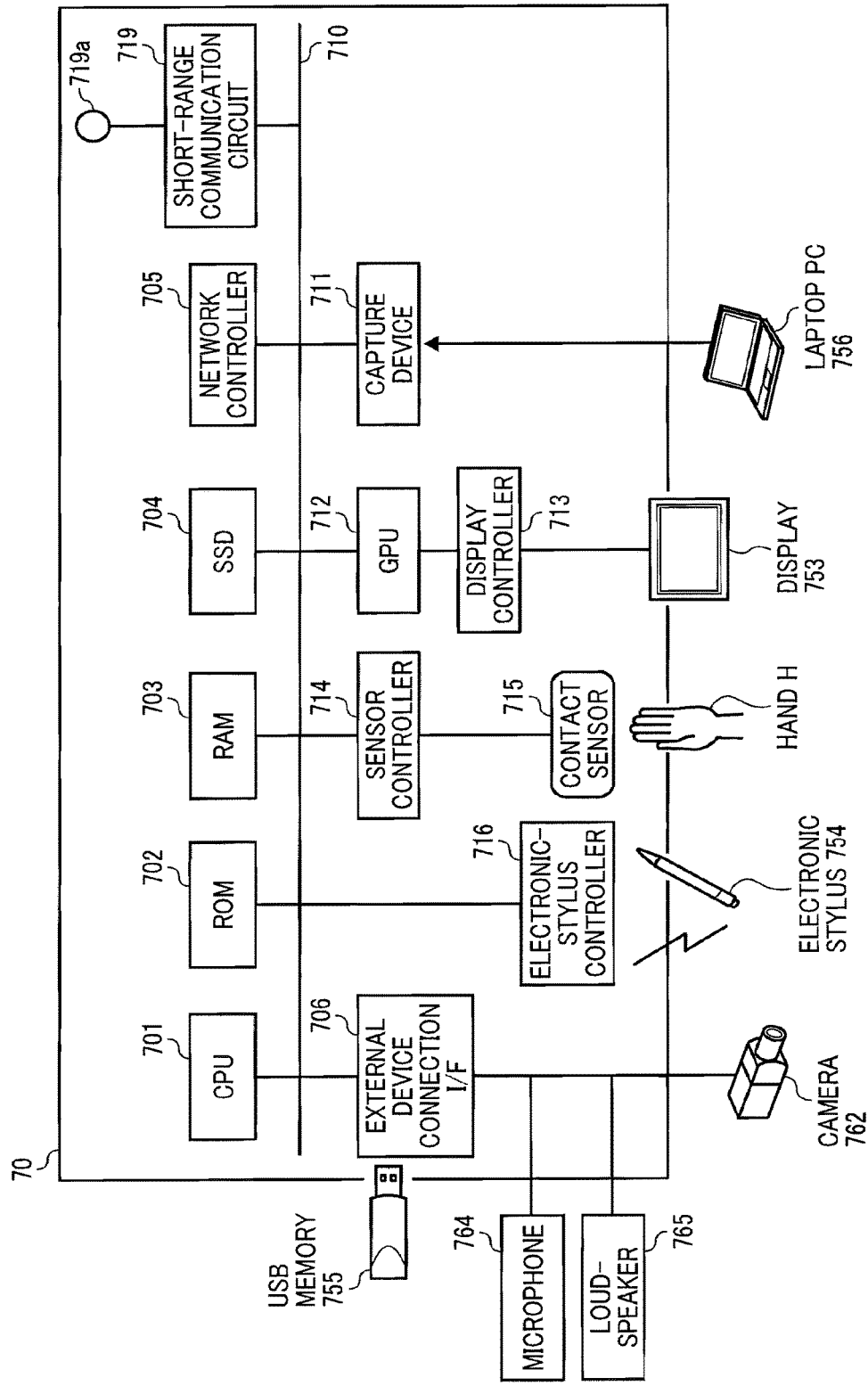
FIG. 4 is a schematic block diagram illustrating a hardware configuration of an electronic whiteboard according to an embodiment of the present invention.

FIG. 4 is a schematic block diagram illustrating the hardware configuration of an electronic whiteboard according to the present embodiment. As illustrated in FIG. 4, the electronic whiteboard 70, as an example of communication terminal 70, includes a CPU 701, a ROM 702, a RAM 703, a SSD 704, a network controller 705, and an external device connection interface (I/F) 706, which are connected through the bus line 710.

The CPU 701 controls entire operation of the electronic whiteboard. The ROM 702 stores a control program for controlling the CPU 701 such as an IPL. The RAM 703 is mainly used as a work area in which the CPU 701 executes a program. The SSD 704 stores various kinds of data such as the control program for the electronic whiteboard. The network controller 705 controls communication with an external device through the communication network 4. The external device connection interface (I/F) 706 controls communication with an external device such as a USB memory 755, and external devices such as a camera 762, a loudspeaker 765, a microphone 764, etc.

The electronic whiteboard 70 further includes a capture device 711, a graphics processing unit (GPU) 712, a display controller 713, a sensor controller 714, a contact sensor 715, an electronic stylus controller 716, a short-range communication circuit 719, and an antenna 719a for the short-range communication circuit 719.

The capture device 711 displays the video data on the display of a laptop personal computer (PC) 756 as a still image or moving images. The GPU 712 is a semiconductor chip specializing in processing graphics. The display controller 713 controls the visual display to output the image generated by the GPU 712 to the display 753 or the like. The contact sensor 715 detects a touch onto the display 753 with an electronic stylus 754 or a user's hand H. The sensor controller 714 controls the operation of the contact sensor 715. The contact sensor 715 senses a touch input to a specific coordinate on the display 735 using the infrared blocking system. More specifically, the display 753 is provided with two photoreceptors disposed on both upper side ends of the display 753, and a reflector frame. The photoreceptors emit a plurality of infrared rays in parallel to a touch panel of the display 753. The photoreceptors receive lights passing in the direction that is the same as an optical path of the emitted infrared rays, which are reflected by the reflector frame. The contact sensor 715 outputs an identifier (ID) of the infrared ray that is blocked by an object (such as the user's hand) after being emitted from the light receiving elements, to the sensor controller 714. Based on the ID of the infrared ray, the sensor controller 714 detects a specific coordinate that is touched. The electronic stylus controller 716 communicates with the electronic stylus 754 to detect a touch by the tip or bottom of the electronic stylus 754 to the display 753. The short-range communication circuit 719 is a communication circuit that communicates in compliance with the NFC (Registered Trademark), the Bluetooth (Registered Trademark), and the like.

The bus line 710 is, for example, an address bus or a data bus, which electrically connects various elements such as the CPU 701 illustrated in FIG. 3.

The contact sensor 715 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the electronic stylus 754, the electronic stylus controller 716 may also detect a touch by another part of the electronic stylus 754, such as a part held by a hand.

<Hardware Configuration of Smartphone>

Figure 5:
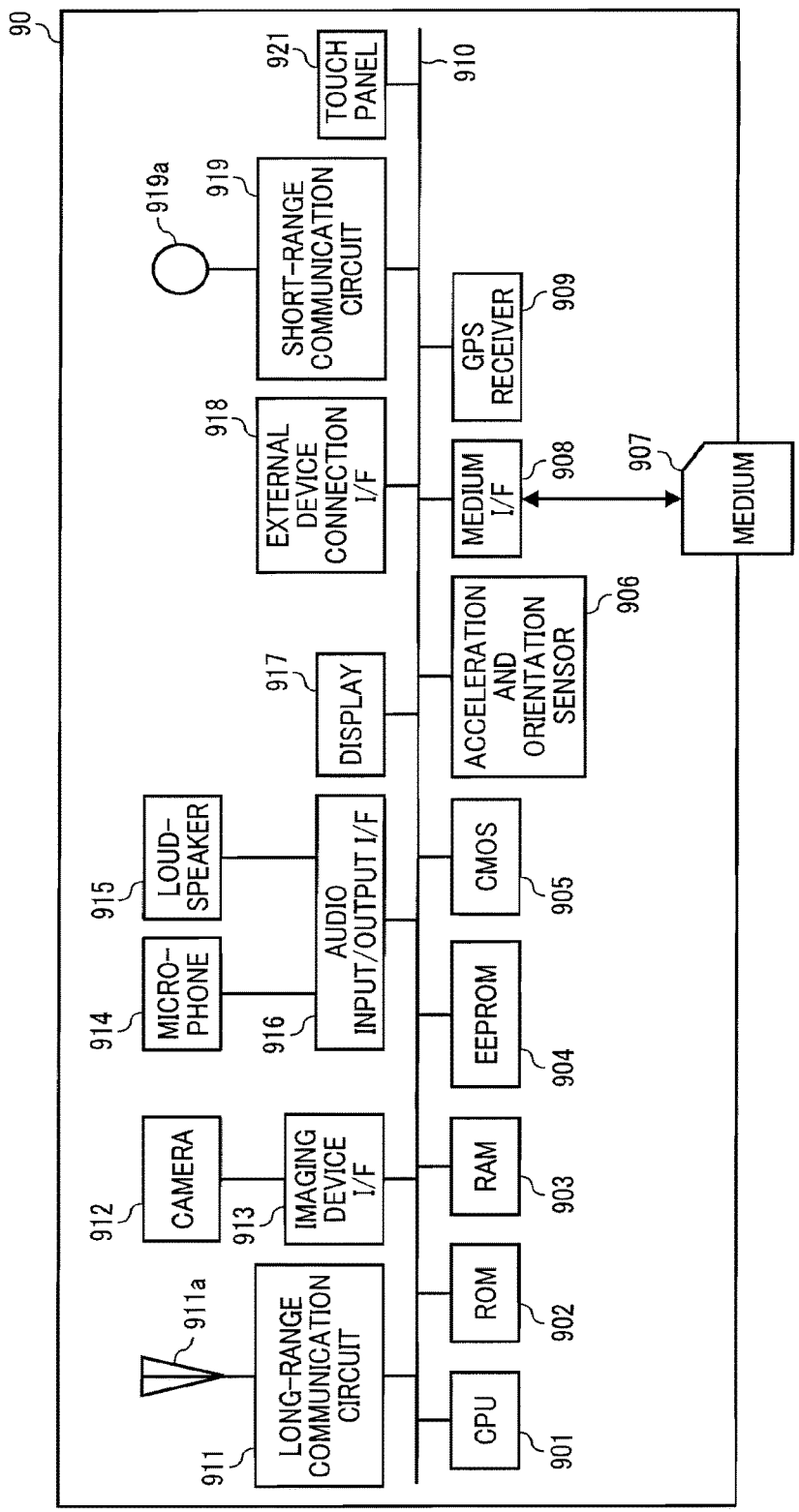
FIG. 5 is a schematic block diagram illustrating a hardware configuration of a smartphone according to an embodiment of the present invention.

FIG. 5 is a schematic block diagram illustrating the hardware configuration of a smartphone according to the present embodiment. As illustrated in FIG. 5, the mobile station 90, which may be implemented by a smartphone, includes a CPU 901, a ROM 902, a RAM 903, a Electrically Erasable and Programmable ROM (EEPROM) 904, a Complementary Metal Oxide Semiconductor (CMOS) sensor 905, an acceleration and orientation sensor 906, a medium I/F 908, and a GPS receiver 909, which are connected through a bus line 910.

The CPU 901 controls the overall operation of the smartphone 90. The ROM 902 stores a program used for driving the CPU 901, the information processing language (IPL), or the like. The RAM 903 is mainly used as a work area in which the CPU 901 executes a program. The EEPROM 904 reads or writes various kinds of data such as a mobile station control program under control of the CPU 901. The CMOS sensor 905 captures an object under the control of the CPU 901 to obtain captured image data. The acceleration and orientation sensor 906 includes various kinds of sensors such as an electromagnetic compass or gyrocompass for detecting geomagnetism and an acceleration sensor. The medium I/F 908 controls reading or writing of data with respect to a recording medium 907 such as a flash memory. The GPS receiver 909 receives a GPS signal from a GPS satellite.

The smartphone further includes a long-range communication circuit 911, a camera 912, an imaging device interface (I/F) 913, a microphone 914, a loudspeaker 915, an audio input and output interface (I/F) 916, a display 917, an external device connection interface (I/F) 918, a short-range communication circuit 919, an antenna 919a of the short-range communication circuit 919, and a touch panel 921.

The long-range communication circuit 911 is a circuit that communicates with the other device through a communication network 2 such as the mobile communication network. The camera 912 is an example of a built-in imaging device that captures a subject under the control of the CPU 901 to obtain image data. The imaging device I/F 913 is a circuit that controls the driving of the camera 912. The microphone 914 is an example of a built-in sound collector capable of inputting audio under the control of the CPU 901. The audio input and output (input/output) interface (I/F) 916 is a circuit for inputting or outputting an audio signal between the microphone 914 and the loudspeaker 915 under the control of the CPU 901. The display 917 may be a liquid crystal or organic electro luminescence (EL) display that displays an image of a subject, an operation icon, or the like. The external device connection I/F 918 is an interface circuit that connects the communication terminal 90 to various kinds of external devices. The short-range communication circuit 919 is a communication circuit that communicates in compliance with the NFC (Registered Trademark), the Bluetooth (Registered Trademark), and the like. The touch panel 921 is an example of input device that enables the user to input a user instruction through touching a screen of the display 917.

The bus line 910 is, for example, an address bus or a data bus, which electrically connects various elements such as the CPU 901 illustrated in FIG. 5.

The mobile station 90 is not limited to a smartphone, but may be implemented, for example, by a tablet, a smart watch, a mobile phone, and a portable game machine.

Further, the control program may be recorded in a file in a format installable or executable on a computer-readable recording medium such as the recording medium 907 for distribution. Examples of the recording medium include, but not limited to, Compact Disc Recordable (CD-R), Digital Versatile Disc (DVD), Blu-ray disc, and SD card.

<<Schematic Configuration of Communication System>>

Figure 6:
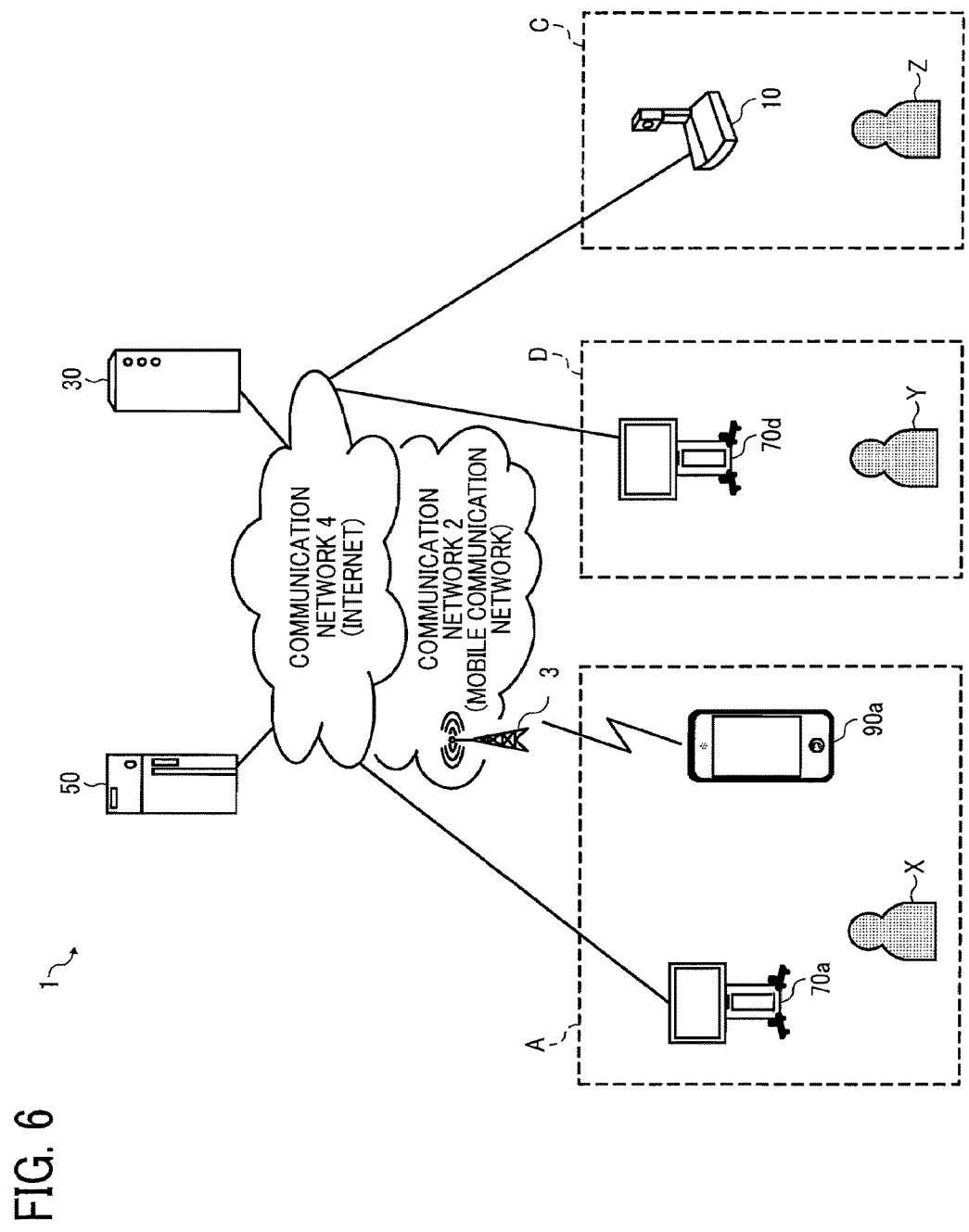
FIG. 6 is a diagram illustrating a schematic network configuration of the communication system of FIG. 1.

Next, the schematic configuration of a communication system according to the present embodiment is described with reference to FIG. 6. FIG. 6 is a diagram illustrating a schematic configuration of a communication system according to the present embodiment of the present invention.

As illustrated in FIG. 6, the communication terminal 70*a* and the mobile station 90*a* are arranged at a base A, and the communication terminal 70*d* is provided at site D. The communication terminal 10 is provided at site C. For example, it is assumed that the base A, the base D, and the base C are Japan, the U.K., and the U.S., respectively. At the base A, a user X of the communication terminal 70*a* uses the mobile station 90*a* that is a kind of the mobile station 90. At the base D, a user Y of the communication terminal 70*d* uses the communication terminal 70*d* that is a kind of the communication terminal 70. Further, at the base C, a user Z of the communication terminal 10 uses the communication terminal 10.

The mobile station 90*a* can perform telecommunication to exchange data with the communication terminal 70*d* or the communication terminal 10 via a base station 3, a communication network 2 such as a mobile communication network, and a communication network 4 including the Internet.

The communication terminal 70*a*, the relay device 30, the communication management system 50, the communication terminal 70*d*, and the communication terminal 10 can perform telecommunication to exchange data with each other via the communication network 4. Note that the communication networks 2 and 4 may include radio communication.

In FIG. 6, the communication terminal 70*a* indicates the local terminal, and the mobile station 90*a* indicates an external terminal.

<<Functional Configuration of Embodiment>>

Figure 7:
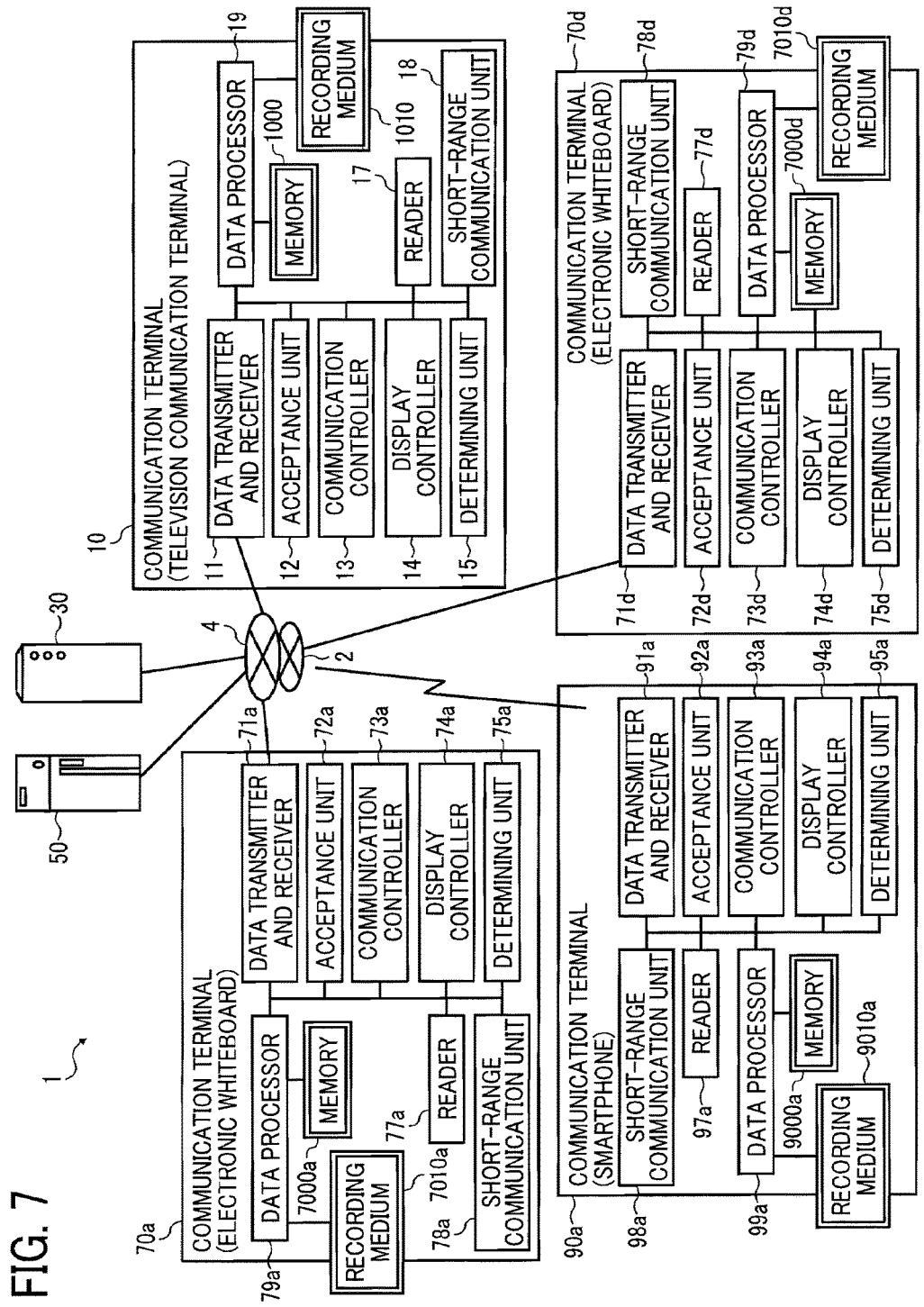
FIG. 7 is a functional block diagram of a communication system according to an embodiment of the present invention.
Figure 8:
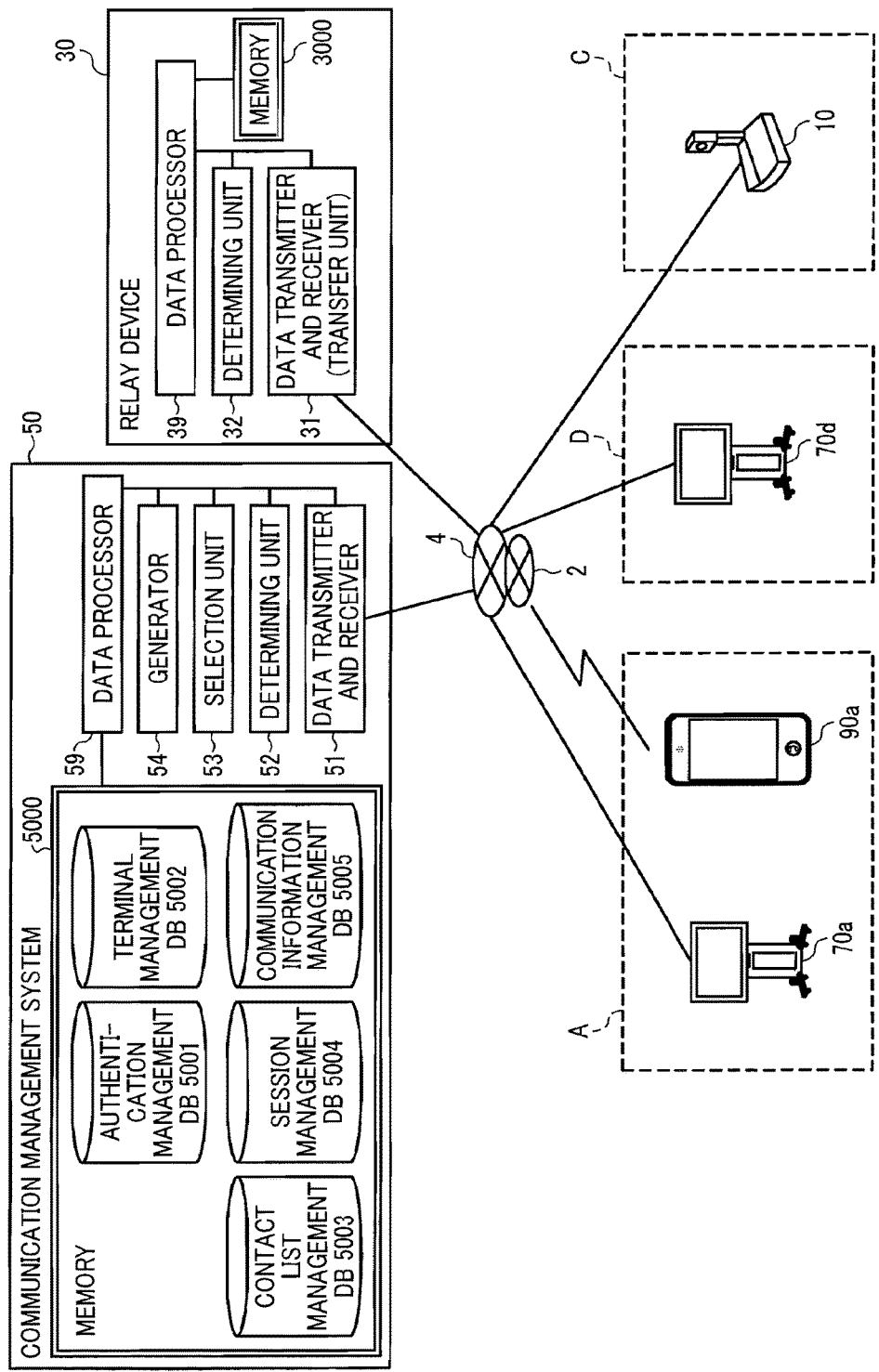
FIG. 8 is a functional block diagram of a communication system according to an embodiment of the present invention.

Next, the functional configuration according to the present embodiment is described with reference to FIG. 2 to FIG. 5, FIG. 7, and FIG. 8. FIG. 7 and FIG. 8 are functional block diagrams of the communication system according to the present embodiment.

<Functional Configuration of Communication Terminal 10>

As illustrated in FIG. 7, the communication terminal 10 includes a data transmitter and receiver 11, an acceptance unit 12, a communication controller 13, a display controller 14, a determining unit 15, a reader 17, a short-range communication unit 18, and a data processor 19. These units are functions that are implemented by or that are caused to function by operating any of the hardware components illustrated in FIG. 2 in cooperation with the instructions of the CPU 101 according to the communication control program expanded from the flash memory 104 to the RAM 103. The communication terminal 10 further includes a memory 1000 configured by the RAM 103 illustrated in FIG. 2, and the flash memory 104 illustrated in FIG. 2.

<Detailed Functional Configuration of Communication Terminal 10>

Next, the components of the communication terminal 10 are described. The data transmitter and receiver 11 is implemented by the instructions from the CPU 101, the network I/F 111, and the external device connection I/F 118, each of which is illustrated in FIG. 2, and transmits or receives various kinds of data (or information) to or from the other terminal, apparatus, or system, through the communication network 4. Before starting communication with a counterpart terminal, the data transmitter and receiver 11 starts receiving terminal status information indicating the operating status of each communication terminal as a candidate counterpart terminal, from the communication management system 50. The status information does not only indicates the operating status of each communication terminal (whether the communication terminal is in an online or offline (disconnected) state), but also indicates a detailed state such as whether an online communication terminal can actually be reached, whether the online communication terminal is currently communicating with another terminal, and whether the user of the online communication terminal is temporarily absent. Hereinafter, the case in which the status information indicates the operating status is described by way of example.

The acceptance unit 12, which is implemented by the instructions of the CPU 101 illustrated in FIG. 2 and by the operation key 108 and the power switch 109 illustrated in FIG. 2, accepts various inputs from the user.

The communication controller 13 is implemented by the instructions of the CPU 101, and any desired device relating to input or output of content data. In one example, the communication control 13 is implemented by the instructions of the CPU 101 illustrated in FIG. 1 and by the camera 112 and the imaging device I/F 113 illustrated in FIG. 1. The communication control 13 captures an image of a subject and outputs image data obtained by capturing the image. In one example, the communication controller 13 is implemented by the instructions of the CPU 101 illustrated in FIG. 2 and by the audio input/output I/F 116 illustrated in FIG. 2. After the sound of the user is converted to an audio signal by the microphone 114, the communication controller 13 receives audio data according to this audio signal. In another example, the communication controller 13 is implemented by the instructions of the CPU 101 illustrated in FIG. 2 and by the audio input/output I/F 116 illustrated in FIG. 2, and outputs the audio signal according to the audio data to the loudspeaker 115, and the loudspeaker 115 outputs audio.

The display control 14 is substantially implemented by the instructions of the CPU 101 illustrated in FIG. 2 and by the display I/F 117 illustrated in FIG. 2. The display control 14 combines received images of different resolutions and transmits the combined image to the display 120. The display control 14 also transmits information on a contact list, received from the communication management system 50, to the display 120, and controls display of the contact list on the display 120.

The reader 17 is substantially implemented by the instructions from the CPU 101, and any desired device relating to input or output of content data. In one example, the reader 17 is implemented by the instructions from the CPU 101, the camera 112, and the imaging device I/F 113, each of which is illustrated in FIG. 2. The reader 17 reads a bar code such as a Quick Response (QR) code (registered trademark) to obtain the data indicated by the bar code.

The short-range communication unit 18 is substantially implemented by the instructions from the CPU 101 and the short-range communication circuit 119 with the antenna 119a illustrated in FIG. 2, and exchanges data by short-range radio communication with a communication terminal for which a short-range communication unit is provided.

The data processor 19 is substantially implemented by the instructions from the CPU 101 and the SSD 105 illustrated in FIG. 2, and stores various kinds of data in the memory 1000 or the recording medium 1010 or to read various kinds of data stored in the memory 1000 or the recording medium 1010.

Further, every time image data and audio data are received in performing communication with another counterpart terminal, the received image data and audio data are overwritten and stored in the memory 1000. The display 120 displays an image based on image data before being overwritten, and the loudspeaker 115 outputs audio based on audio data before being overwritten. The recording medium 1010 is implemented by the USB recording medium 106 illustrated in FIG. 2.

Note that terminal ID in the present embodiment is an example of terminal identification information that is used to uniquely identify the communication terminal 10. Such terminal identification information includes a language, a character, a symbol, or various kinds of marks. For example, a combination of at least two of the above-mentioned language, character(s), symbol(s), and various marks may be used as terminal ID. Instead of terminal ID, a user ID for identifying the user at the communication terminal 10 may be used. In such case, terminal identification information includes not only the terminal ID, but also the user ID.

<Functional Configuration of Relay Device>

As illustrated in FIG. 8, the relay device 30 includes a data transmitter and receiver 31 that also serves as a transfer unit, a determining unit 32, and a data processor 39. These units are functions that are implemented by or that are caused to function by operating any of the elements illustrated in FIG. 3 in cooperation with the instructions of the CPU 501 according to the relay device control program expanded from the HD 504 to the RAM 503. The relay device 30 also includes a memory 3000 implemented by the RAM 503 illustrated in FIG. 3 and/or the HD 504 illustrated in FIG. 3.

<Detailed Functional Configuration of Relay Device>

Next, the functional configuration of the relay device 30 is described in detail. In the following description of the functional configuration of the relay device 30, the relation of the hardware elements in FIG. 3 with the functional configuration of the relay device 30 in FIG. 8 will also be described.

The data transmitter and receiver 31 of the relay device 30 illustrated in FIG. 8 is implemented by the instructions from the CPU 501 illustrated in FIG. 3 and by the network I/F 509 illustrated in FIG. 3, and transmits or receives various kinds of data (or information) to or from another terminal, device, or system, via the communication network 4. The data transmitter and receiver 31 also serves as a transferor to transfer the image data and audio data transmitted from a prescribed communication terminal (such as the communication terminal 10) to another communication terminal (such as the communication terminal 70).

The determining unit 32 is implemented by the instructions from the CPU 501 illustrated in FIG. 3, and determines delay of data transmission or the like.

The data processor 39 is implemented by the instructions from the CPU 501 illustrated in FIG. 3 and the HDD 505 illustrated in FIG. 3, and stores various kinds of data in the memory 3000 or read various kinds of data stored in the memory 3000.

<Functional Configuration of Communication Management System>

As illustrated in FIG. 8, the communication management system 50 includes a data transmitter and receiver 51, a determining unit 52, a selection unit 53, a generator 54, and a data processor 59. These units are functions that are implemented by or that are caused to function by operating any of the elements illustrated in FIG. 7 in cooperation with the instructions of the CPU 501 according to the communication management program expanded from the HD 504 to the RAM 503. The communication management system 50 also includes a memory 5000 that is configured by the HD 504 illustrated in FIG. 3.

<Authentication Management Table>

FIG. 9 is a diagram illustrating an authentication management table according to the present embodiment. In the memory 5000, as illustrated in FIG. 9, an authentication management database (DB) 5001 that is made of an authentication management table is stored. The authentication management table stores, for each one of the communication terminals 10, 70, and 90 managed by the communication management system 50, the terminal ID and the password in association with each other. For example, the authentication management table illustrated in FIG. 9 indicates that the terminal ID of the terminal 70aa, which is a kind of the communication terminal 70, is "01aa", and the password of the terminal 70aa is "aaaa". Such a password is an example of authentication data, and the authentication data may include an access token.

<Terminal Management Table>

FIG. 10 is a diagram illustrating a terminal management table according to the present embodiment. In the memory 5000, as illustrated in FIG. 10, a terminal management database (DB) 5002 that is made of a terminal management table is stored. The terminal management table stores, for the terminal ID of each one of the communication terminals 10, 70, and 90) managed by the communication management system 50, the name of destination address when each of the communication terminals 10, 70, and 90 serves as a counterpart terminal, the operating status of the communication terminals 10, 70, and 90, the date and time when login requesting information, as will be described later, is received at the communication management system 50, and the IP address of each of the communication terminals 10, 70, and 90, in association with one another. For example, the terminal management table illustrated in FIG. 10 indicates that the terminal 10aa with the terminal ID "01aa" has the terminal name "AA terminal, Tokyo office, Japan", the operating status "online", the date and time received at which login requesting information is received by the communication management system 50 "Apr. 10, 2015, 13:40", and the IP address "1.2.1.3". The terminal ID, the name of destination address, and the terminal IP address in the terminal management table of FIG. 10 are registered by the communication management system 50, when the communication management system 50 accepts registration of each of the communication terminals 10, 70, and 90 that requests services from the communication management system 50.

<Contact List Management Table>

FIG. 11 is a diagram illustrating a contact list management table according to the present embodiment. In the memory 5000, as illustrated in FIG. 11, a contact list management data base (DB) 5003 that is made of a contact list management table is stored. In the contact list management table, the terminal ID of starting terminals that request the startup of communication is all associated with the terminal ID of counterpart terminals registered as candidates for counterpart terminals, and is managed. For example, the contact list management table illustrated in FIG. 11 indicates that candidate counterparts to which a starting terminal (terminal 10$aa$) whose terminal ID is "01$aa$" can send a request to start communication in a video conference are the terminal 10$ab$ whose terminal ID is "01$ab$", the terminal 10$ba$ whose terminal ID is "01$ba$", and the terminal 10$bb$ whose terminal ID is "01$bb$". The candidate counterpart terminals are updated by addition or deletion in response to an adding or deleting request received from any request sender terminal (starting terminal) to the communication management system 50.

The contact list is just one example of contact information indicating a candidate of counterpart communication terminals, such that the contact information may be managed in various ways other than in the form of contact list, as long as the counterpart terminal information such as terminal ID of a candidate counterpart is associated with the starting terminal.

<Session Management Table>

FIG. 12 is a diagram illustrating a session management table according to the present embodiment. In the memory 5000, as illustrated in FIG. 12, a session management data base (DB) 5004 that is made of a session management table is stored. In the session management table, the relay device ID of the relay device 30 to be used, the terminal ID of a starting terminal, the terminal ID of a counterpart terminal, the delay time (millisecond (ms)) in reception when image data is received by the counterpart terminal, and date and time when the delay information indicating the delay time is sent from the counterpart terminal and is received at the communication management system 50 are associated with each communication session ID that identifies the session of telecommunication between a communication terminal and relay device 30. For example, the session management table illustrated in FIG. 12 indicates that the session is performed using the session ID "se01", the relay device (with the relay device ID "111$a$") relays image data and audio data between the starting terminal (terminal 10$aa$) with the terminal ID "01$aa$" and the counterpart terminal (terminal 10$db$) with the terminal ID "01$db$", and that the delay time of the image data at the counterpart terminal (terminal 10$db$) at "13:41, Apr. 10, 2015" is 200 ms.

<Communication Information Management Table>

FIG. 13 is a diagram illustrating a communication information management table according to the present embodiment. In the memory 5000, as illustrated in FIG. 13, a communication information management data base (DB) 5005 that is made of a communication information management table is stored. In the communication information management table, the IP address of the relay device 30 to be used and the terminal ID of the communication terminals for telecommunication are associated with each communication ID that identifies the telecommunication performed between the communication terminals and the relay device 30. Note that the communication ID is an example of communication identification information. When conference is held among a plurality of terminals, the communication ID indicates conference ID that identifies the conference. For example, the communication information management table illustrated in FIG. 13 indicates that the telecommunication is identified by the communication ID "co01", the IP address of the relay device (relay device ID "111$a$") is "1.2.1.2", and that the terminal ID of the communicating terminals includes "01$ab$" and "01$da$".

<Detailed Functional Configuration of Communication Management System>

Next, the functional configuration of the communication management system 50 is described in detail. In the following description of the functional configuration of the communication management system 50, relation of the hardware configuration of FIG. 3 with functional configuration of the communication management system 50 in FIG. 8 will also be described.

The data transmitter and receiver 51 of the communication management system 50 illustrated in FIG. 8 is implemented by the instructions of the CPU 501 illustrated in FIG. 3 and by the network I/F 509 illustrated in FIG. 3, and transmits or receives various types of data (or information) to or from another terminal, device, or system via the communication network 4.

The determining unit 52 is implemented by the instructions of the CPU 501 illustrated in FIG. 3, and determines delay of data transmission or the like.

The selection unit 53 is implemented by the instructions from the CPU 501 illustrated in FIG. 3, and selects, based on the IP address of each of the communication terminals participating in a communication session, a relay device suited to telecommunication among terminals through the communication session.

The generator 54 is implemented by the instructions from the CPU 501 illustrated in FIG. 3, and generates communication information according to the request to start telecommunication sent from a terminal. The communication information includes, for example, the IP address of the relay device selected by the selection unit 53 and the communication ID.

The data processor 59, which may be implemented by the instructions of the CPU 501 illustrated in FIG. 3 and the HDD 505 illustrated in FIG. 3, performs processing to store various types of data in the memory 5000 or read various types of data stored in the memory 5000.

<Functional Configuration of Communication Terminal 70$a$>

As illustrated in FIG. 7, the communication terminal 70$a$ includes a data transmitter and receiver 71$a$, an acceptance unit 72$a$, a communication controller 73$a$, a display controller 74$a$, a determining unit 75$a$, a reader 77$a$, a short-range communication unit 78$a$, and a data processor 79$a$. These units are functions that are implemented by or that are caused to function by operating any of the elements illustrated in FIG. 4 in cooperation with the instructions of the CPU 701 according to the communication control program expanded from the SSD 704 to the RAM 703. The communication terminal 70$a$ further includes a memory 7000$a$ configured by the RAM 703 illustrated in FIG. 4, and the SSD 704 illustrated in FIG. 4.

(Detailed Functional Configuration of Communication Terminal 70a)

Next, the components of the communication terminal 70a are described. The data transmitter and receiver 71a is implemented by the instructions from the CPU 701, the network controller 705, and the external device connection I/F 706, each of which is illustrated in FIG. 4, and exchanges various kinds of data (or information) with another communication terminal, apparatus, or system through the communication network 4. Before starting communication with other communication terminals 10, 70d, and 90a, the data transmitter and receiver 71a starts receiving terminal status information indicating the operating status of the communication terminals 10, 70d, and 90a as candidate counterparts, from the communication management system 50. The status information does not only indicates the operating status of the communication terminals 10, 70a, and 90a (whether each of the communication terminals is in an online or offline state), but also indicates a detailed state such as whether an online communication terminal can actually be reached, whether the online communication terminal is currently communicating with another terminal, and whether the user of the online communication terminal is temporarily absent. In addition, the status information not only indicates the operating status of each terminal, but also indicates various states, such as the state that the cable 120c is disconnected from the communication terminal 10, the state that some of the communication terminals 10, 70d, and 90a can output sounds but not images, or the state that some of the communication terminals 10, 70d, and 90a is muted. Hereinafter, the case in which the status information indicates the operating status is described by way of example.

Further, the data transmitter and receiver 71a may also serve as a starting unit and starts communication with another communication terminal such as the communication terminal 10.

The acceptance unit 72a is substantially implemented by the instructions from the CPU 701, the contact sensor 715, and the electronic stylus controller 716, each of which is illustrated in FIG. 4, and accepts various kinds of inputs.

The communication controller 73a obtains drawing data that is drawn on the display 753 using the electronic stylus 554 or the hand H, and converts the drawing data into coordinate data that serves as stroke data. Further, when the communication terminal 70a transmits the drawing data to the communication terminal 70d, for example, the communication terminal 70d controls the display 753 of the electronic whiteboard 70d to display the same drawing based on the drawing data received from the communication terminal 70a.

The communication controller 73a is substantially implemented by the instructions of the CPU 701 illustrated in FIG. 4, in cooperation with any desired device relating to input or output of content data. In one example, the communication controller 13 performs image processing on an image captured by the camera 762. In another example, the communication controller 73a is implemented by the instructions from the CPU 701, and after the audio of the user is converted to an audio signal by the microphone 764, the communication controller 73a processes audio data based on this audio signal. In another example, the communication controller 73a is implemented by the instructions from the CPU 701 illustrated in FIG. 4, and outputs the audio signal according to the audio data to the loudspeaker 765 such that the loudspeaker 765 outputs a sound.

The display control 74a is substantially implemented by the instructions of the CPU 701 illustrated in FIG. 4 and by the display controller 713 illustrated in FIG. 4. The display control 74 combines the received image data of different resolutions and transmits the combined image data to the display 753. The display control 74a may also transmit information on a contact list, received from the communication management system 50, to the display 753, and control display of the contact list on the display 753.

The determining unit 75a is substantially implemented by the instructions from the CPU 701 illustrated in FIG. 4, and determines whether any other communication terminal including a short-range communication unit is within a predetermined distance from the communication terminal 70a.

The reader 77a is substantially implemented by the instructions from the CPU 701, the camera 762, and the external device connection interface (I/F) 706, each of which is illustrated in FIG. 4, and reads a bar code such as a Quick Response (QR) code to obtain the data indicated by the bar code.

The short-range communication unit 78a is substantially implemented by the instructions from the CPU 701 and the short-range communication circuit 719 provided with the antenna 719a, each of which is illustrated in FIG. 4, and communicates with the mobile station 90 to exchange data by short-range radio communication.

The data processor 79a is substantially implemented by the instructions from the CPU 701 and the SSD 704 illustrated in FIG. 4. The data processor 79a stores various types of data in the memory 7000 or the recording medium 7010a or reads various types of data from the memory 7000 or the recording medium 7010a.

Further, every time image data and audio data are received in performing communication with another communication terminal, the memory 7000 overwrites the image data and audio data. The display 753 displays an image based on image data before being overwritten, and the loudspeaker 765 outputs audio based on audio data before being overwritten. The recording medium 7010a is implemented by the USB memory 755 that is illustrated in FIG. 4.

<Functional Configuration of Communication Terminal 70d>

As illustrated in FIG. 7, the communication terminal 70d includes a data transmitter and receiver 71d, an acceptance unit 72d, a communication controller 73d, a display controller 74d, a determining unit 75d, a reader 77d, a short-range communication unit 78d, and a data processor 79d. As these components of the communication terminal 70d have the functions equivalent to those of the data transmitter and receiver 71a, the acceptance unit 72a, the communication controller 73a, the display controller 74a, the determining unit 75a, the reader 77a, the short-range communication unit 78a, and the data processor 79a of the communication terminal 70a, respectively, the description is omitted.

<Functional Configuration of Mobile Station>

As illustrated in FIG. 7, the mobile station 90a includes a data transmitter and receiver 91a, an acceptance unit 92a, a communication controller 93a, a display controller 94a, a determining unit 95a, a reader 97a, a short-range communication unit 98a, and a data processor 99a. These units are functions that are implemented by or that are caused to function by operating any of the hardware elements illustrated in FIG. 5 in cooperation with the instructions of the CPU 901 according to the communication control program expanded from the EEPROM 904 to the RAM 903. The communication terminal 90 further includes a memory 9000a configured by the RAM 903 illustrated in FIG. 5 and the EEPROM 904 illustrated in FIG. 5.

<Detailed Functional Configuration of Mobile Station>

Next, the components of the mobile station 90a are described. The data transmitter and receiver 91a is substantially implemented by the instructions from the CPU 901 and the long-range communication circuit 911 with the antenna 911a, each of which is illustrated in FIG. 5. The data transmitter and receiver 91a exchanges various types of data, such as communication data, with another communication terminal, apparatus, or system through the communication network 2.

The acceptance unit 92a is substantially implemented by the instructions of the CPU 901 illustrated in FIG. 5 and by the touch panel 921 illustrated in FIG. 5, and receives various kinds of inputs from the user.

The communication controller 93a is implemented by the instructions from the CPU 901 illustrated in FIG. 5 in cooperation with any desired device relating to input or output of content data. In one example, the communication controller 93a is substantially implemented by the instructions from the CPU 901 in cooperation with the imaging device I/F 913, and applies image processing to an image captured by the camera 912. In another example, the communication controller 93a may be implemented by the instructions from the CPU 901 in cooperation with the audio input and output interface (I/F) 916. After the voice of a user is converted into an audio signal by the microphone 914, the communication controller 93a processes the audio data of the obtained audio signal. In another example, the communication controller 93a may be implemented by the instructions from the CPU 901 and the audio input and output interface (I/F) 916, each of which is illustrated in FIG. 5. In this example, the communication controller 93a outputs the audio signal based on the audio data to the loudspeaker 915, and the loudspeaker 915 outputs the sound.

The display control 94a is substantially implemented by the instructions from the CPU 901 illustrated in FIG. 5, and controls the display 917 to display the image data thereon.

The determining unit 95a is substantially implemented by the instructions from the CPU 901 illustrated in FIG. 5, and outputs a determination result as will be described later.

The reader 97a is substantially implemented by the instructions from the CPU 901, the camera 912, and the imaging device interface (I/F) 913, each of which is illustrated in FIG. 5, and reads a bar code such as a Quick Response (QR) code to obtain the data indicated by the bar code.

The short-range communication unit 98a is substantially implemented by the instructions from the CPU 901 and the short-range communication circuit 919 provided with the antenna 919a, each of which is illustrated in FIG. 5. The short-range communication unit 98a communicates with another communication terminal to exchange data by short-range radio communication.

The data processor 99a is substantially implemented by the instructions from the CPU 901 and the EEPROM 904, each of which is illustrated in FIG. 5. The data processor 99a stores various types of data in the memory 9000a or read various types of data from the memory 9000a.

<<Operation>>

Next, the operation of the communication system 1 according to the present embodiment is described with reference to FIG. 6, FIG. 14A to FIG. 23. Firstly, the situation according to the present embodiment is briefly described with reference to FIG. 6. When a user X at a site A wishes to start telecommunication such as a video conference with a user Y at a site D, it is easier and more convenient for the user X to use the mobile station 90a at hand to start communication than using the communication terminal 70a that is a stationary electronic whiteboard where the electronic stylus 754 or the like is used to start communication. However, once the telecommunication between the mobile station 90a and the counterpart terminal (i.e., the communication terminal 70d in the present embodiment) starts, the size of the display 917 of the mobile station 90a is much smaller than the size of the display 753 of the communication terminal 70a that is an electronic whiteboard. For this reason, depending on the type of topic of the conference or the like, there are some cases in which it is not easy to sufficiently communicate with the user Y on the counterpart terminal side through the telecommunication. In view of the above circumstances, the user X firstly uses the mobile station 90a, which is handy, and selects a counterpart terminal from the contact list displayed on the mobile station 90a. Depending on the topic and contents to be discussed in the conference or the like, if the user X can satisfactorily communicate with the user Y on the counterpart terminal side through the telecommunication, the user X may keep using the mobile station 90a. If the user X cannot satisfactorily communicate with the user Y on the counterpart terminal side through the telecommunication, the user X may switch from the mobile station 90a to the communication terminal 70a.

It is to be noted that, according to the present embodiment, after switching from the mobile station 90a to the communication terminal 70a is complete, a user Z at a site C as a third party can join the telecommunication between the communication terminal 70a and the communication terminal 70d by sending a participation request to the mobile station 90a that is the switching terminal, or by sending a participation request to the communication terminal 70a that is the terminal to be switched to. Hereinafter, more detailed description thereof is given.

Figure 14B:
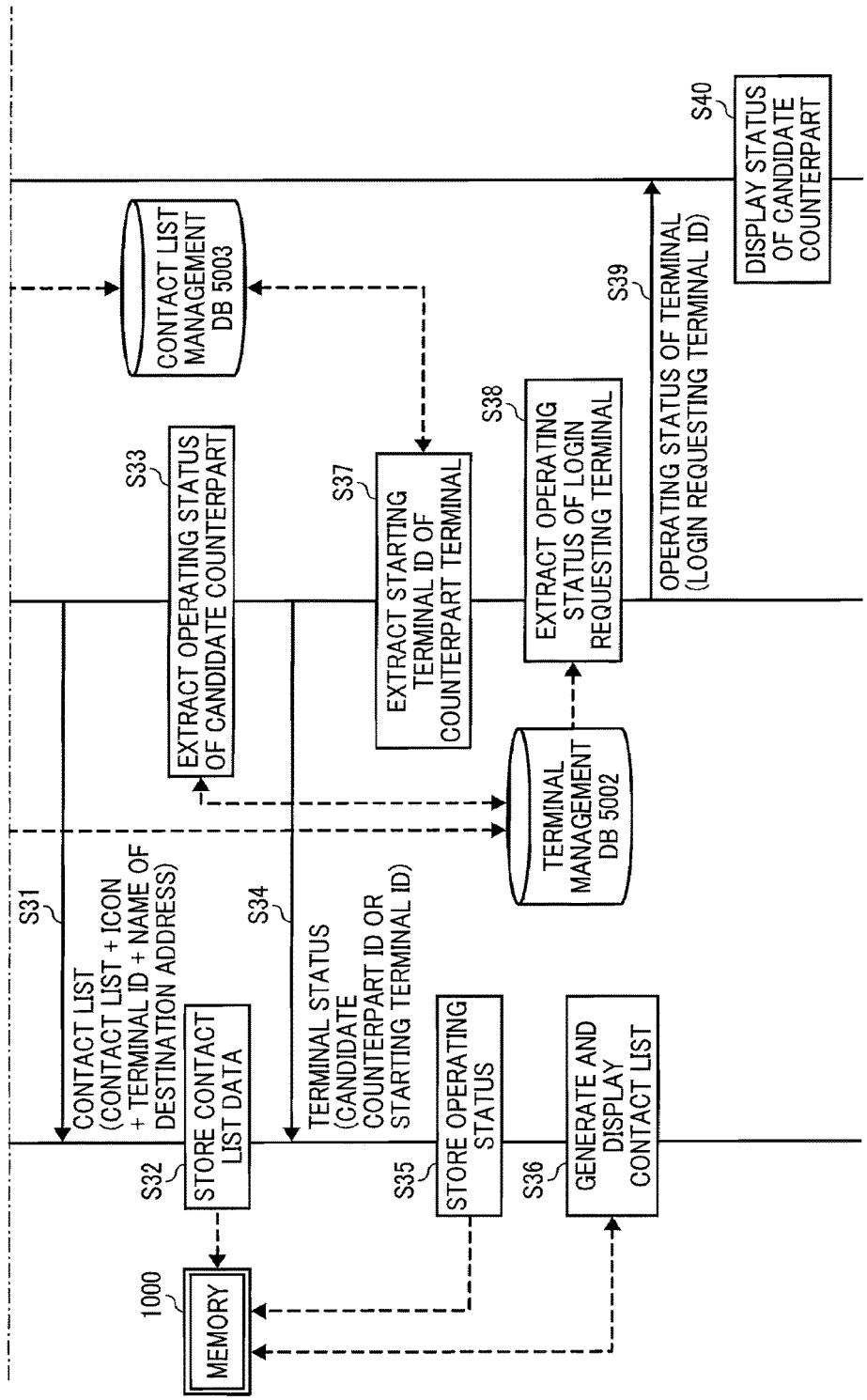
Figure 15A:
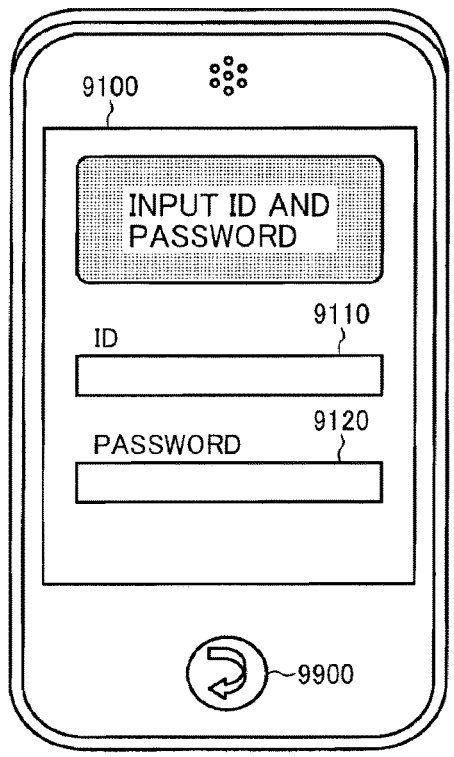
FIG. 15A illustrates an example of a login screen of a mobile station, according to an embodiment of the present invention.
Figure 15B:
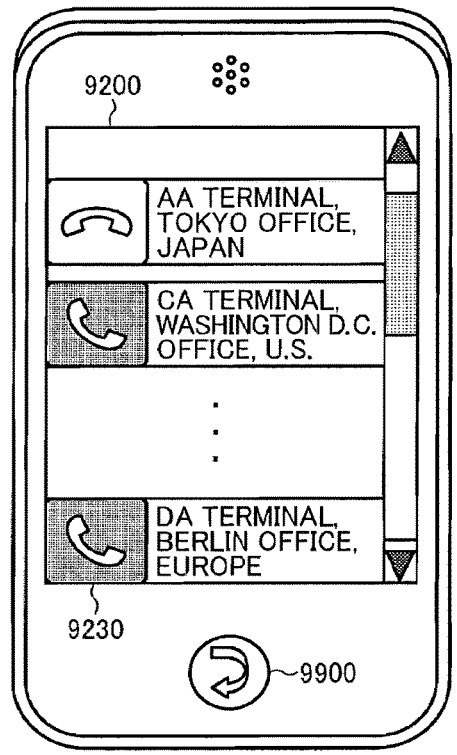
FIG. 15B illustrates an example of a contact list displayed on a mobile station, according to an embodiment of the present invention.
Figure 15C:
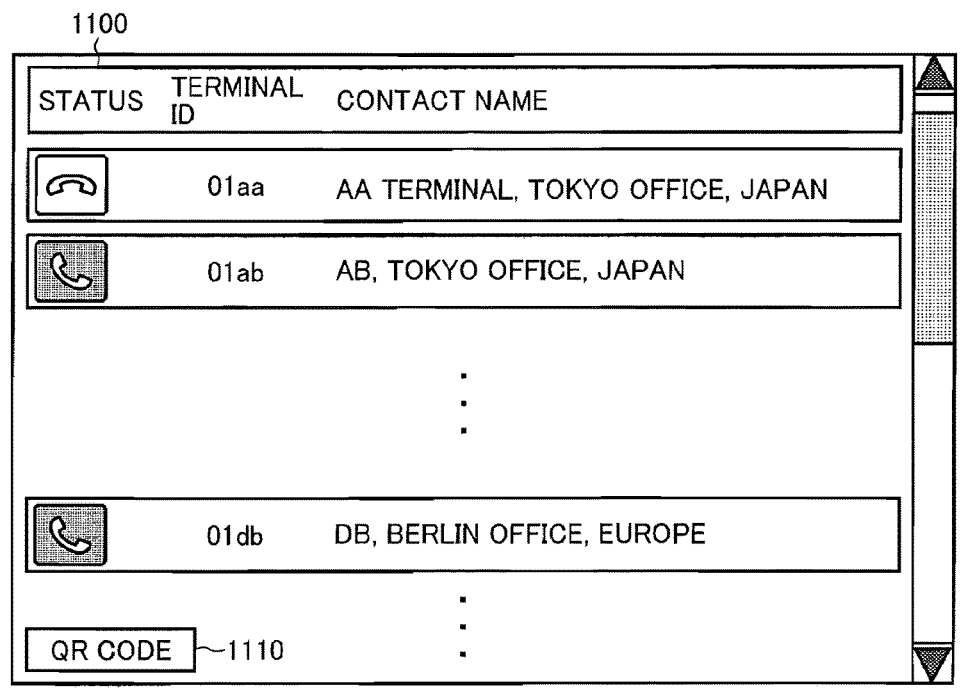
FIG. 15C illustrates an example of a contact list displayed on a communication terminal 10, according to an embodiment of the present invention.
Figure 16:
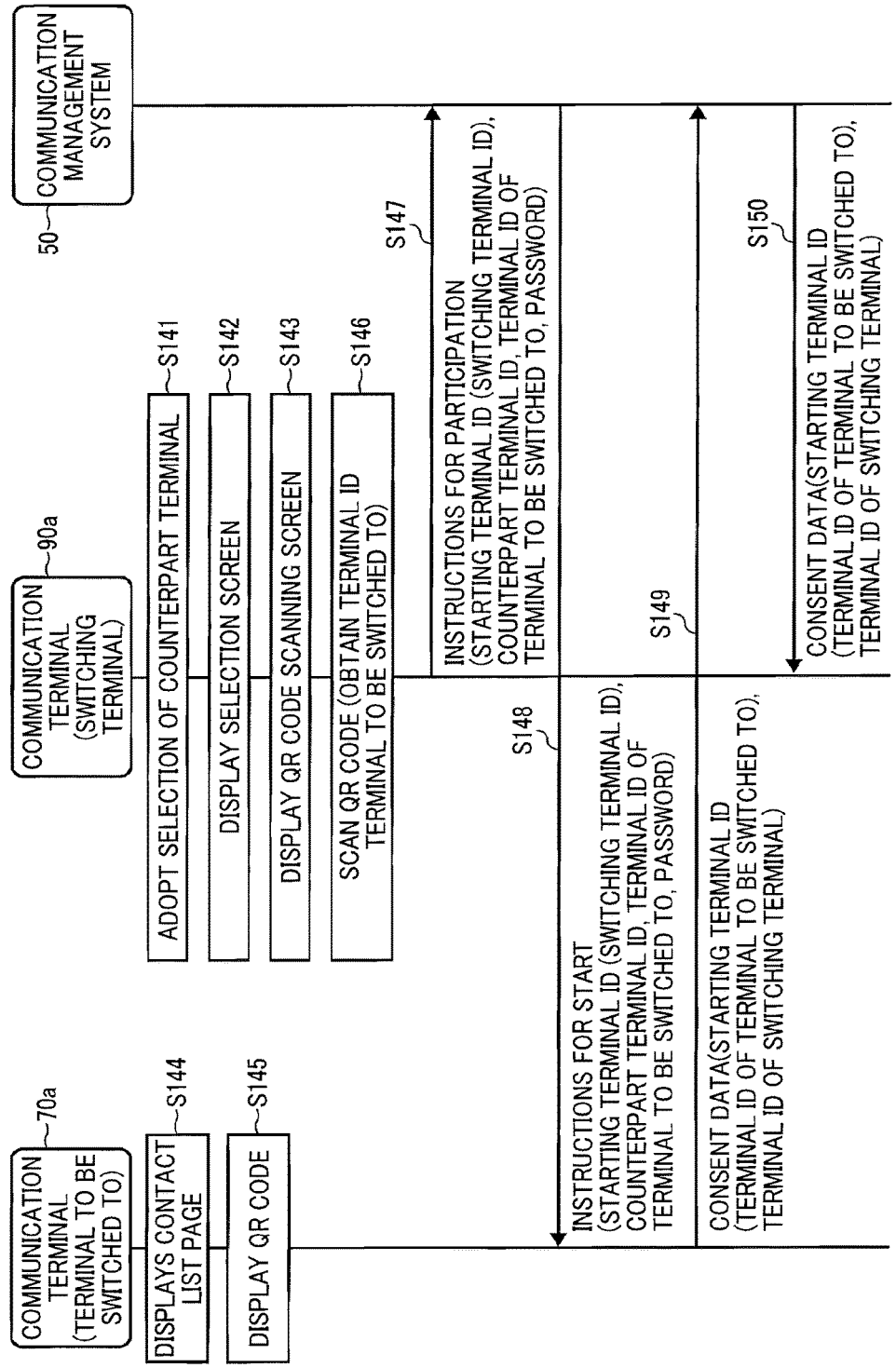
FIG. 16 is a sequence diagram illustrating the processes of switching the telecommunication to a terminal to be switched to, while a switching terminal is communicating with an external terminal.

Firstly, the preparation processes for communication that the mobile station 90a performs as a login requesting terminal are described with reference to FIG. 14A, FIG. 14B, FIG. 15A, FIG. 15B, and FIG. 15C. FIG. 14A and FIG. 14B are a sequence diagram illustrating the preparation processes for communication. FIG. 15A illustrates an example of a login screen of the mobile station 90a, according to the present embodiment. FIG. 15B illustrates an example of a contact list displayed on the mobile station 90a, according to the present embodiment. FIG. 15C illustrates an example of a contact list displayed on the communication terminal 10, according to the present embodiment.

Firstly, the display controller 94a of the mobile station 90a controls a display to display an initial screen 9100 as illustrated in FIG. 15A. The initial screen 9100 displays an input field 9110 to which terminal ID is to be input and an input field 9120 to which a password is to be input. Note also that a key 9900 is to be touched to make a selection or decision. When the terminal ID and the password of the user X is input to the input field 9110 and the input field 9120, respectively, the acceptance unit 92a receives the input of the terminal ID and the password (step S21). Then, the data transmitter and receiver 91a generates a session ID to identify the communication session (step S22).

Then, the data transmitter and receiver 91a transmits login requesting data indicating a login authentication request to the communication management system 50 through the communication networks 2 and 4 (step S23). The login requesting information includes the terminal ID and the password input in the step S21.

Next, the data processor 59 of the communication management system 50 performs terminal authentication by searching the authentication management table of FIG. 9 using the terminal ID and the password included in the login requesting information received via the data transmitter and receiver 51 as search keys, and determining whether the same terminal ID and the same password are managed in the authentication management table of FIG. 9 (step S24). In the present embodiment, it is assumed that the data processor 59 manages the same terminal ID and the same password.

When the data processor 59 manages the same terminal ID and the same password and determines that the login request is sent from an authorized terminal, the data processor 59 changes the operating status field of the terminal ID received in the step S23 as above to "online" in the record of the terminal management table (see FIG. 10), and stores, in the field of received date and time, the date and time at which the login requesting information is received in the step S23 as above (step S25). For example, if the communication terminal 70a has the terminal ID "01ab", the data processor 59 stores the operating status "Online" and the received date and time "12:00, Apr. 9, 2015" in association with the IP address "1.2.1.4" in the terminal management table. Note that the IP address of the communication terminal may be transmitted from the mobile station 90a in the step S23 as above instead of being registered in the terminal management table in advance.

Subsequently, the data processor 59 adds a new record including the terminal ID and password of the communication terminal 90a of the user, which was received in the step S23 as above, in the session management table (see FIG. 12) (step S26). Then, the data transmitter and receiver 51 of the communication management system 50 transmits authentication result information indicating an authentication result obtained in the step S24 to the mobile station 90a that has sent the above-mentioned login request, via the communication network 4 and the communication network 2 (step S27).

When the data transmitter and receiver 91a of the login requesting terminal (i.e., the mobile station 90a) receives the authentication result information indicating that the communication terminal 90a is an authorized terminal, the data transmitter and receiver 91a transmits contact list requesting information that requests a contact list to the communication management system 50 through the communication networks 4 and 2 (step S28). Accordingly, the data transmitter and receiver 51 of the communication management system 50 receives the contact list requesting information.

Next, the data processor 59 of the communication management system 50 searches the contact list management table (see FIG. 11), using the terminal ID "01ab" of the login requesting terminal (i.e., the mobile station 90a) which has sent the login request as a search key, to extract the terminal ID of a candidate counterpart that can communicate with the login requesting terminal (i.e., the mobile station 90a). The data processor 59 of the communication management system 50 further reads out the name of destination address associated with each one of the extracted terminal ID from the terminal management table (see FIG. 10) (step S29). In the present embodiment, at least the terminal ID and the associated name of destination address, for each one of one or more candidate counterparts for the login requesting terminal (i.e., the mobile station 90a) with the terminal ID "01ab", are extracted.

Next, the data transmitter and receiver 51 of the communication management system 50 uses data processor 59 to read contact list frame data, and icon data indicating the operating status of each candidate counterpart terminal that is read, from the memory 5000 (step S30). The data transmitter and receiver 51 further transmits the contact list information to the login requesting terminal (i.e., the mobile station 90a) (step S31). The contact list information that is read using data processor 59 includes the contact list frame data, and the icon data, the terminal ID, and the terminal name of destination address. Accordingly, the data transmitter and receiver 91a of the login requesting terminal (i.e., the mobile station 90a) receives the contact list information, and the data processor 99a stores the received contact list information in the memory 9000a (step S32).

As described above, in the present embodiment, instead of managing contact list information at each communication terminal, the communication management system 50 centrally the list information for all of the communication terminals. In this way, even when a communication terminal is newly added to the communication system 1 or an existing communication terminal is replaced with a different type of communication terminal in the communication system 1, or even when the appearance of the contact list is changed, the communication management system 50 can centrally reflect such changes without requiring each communication terminal to reflect such changes in the contact list information.

The data processor 59 of the communication management system 50 searches the terminal management table (see FIG. 10) using the above extracted terminal ID of the candidate counterparts, as search keys, to obtain the operating status of the communication terminals (step S33).

Next, the data transmitter and receiver 51 of the communication management system 50 transmits terminal status information including the terminal ID that serves as the search keys used in the step S33 as described above and the operating status of the corresponding counterpart terminals to the starting terminal (i.e., the communication terminal 70a) via the communication network 4 (S34).

Next, the data processor 79a of the starting terminal (i.e., the communication terminal 70a) sequentially stores in the memory 7000a the terminal status information received from the communication management system 50 (step S35). Based on the terminal status information received for each candidate counterpart as described above, the starting terminal (i.e., the communication terminal 70a) can obtain the current operating status of a candidate counterpart for the starting terminal (i.e., the communication terminal 70a) such as the operating status of the communication terminal 10.

Next, the display controller 94a of the login requesting terminal (i.e., the mobile station 90a) generates a contact list that reflects the current operating status of each candidate counterpart based on the contact list information stored in the memory 9000a and the terminal status information, and the display controller 94a displays contact list page 9200 on the display 917, as illustrated in FIG. 15B (step S36). On the contact list page 9200, an icon indicating the operating status of each counterpart terminal and the names of the destination addresses are displayed as in counterpart terminal information 9230. In FIG. 20, the icons each reflecting the operating status of the corresponding terminal are displayed at left. In FIG. 15B, the icon indicating the operating status of a communication terminal "offline" is displayed on the top, and the icons indicating the operational status of terminals "online" are displayed below the icon of "offline".

The data processor 59 of the communication management system 50 searches the contact list management table (see FIG. 11) using the terminal ID "01ab" of the login requesting terminal (i.e., the mobile station 90a) as a search key, to extract the terminal ID of other terminals that register the terminal ID "01ab" as a candidate counterpart (step S37). In the contact list management table illustrated in FIG. 11, the terminal ID of other terminals to be extracted are, for example, "01aa" and "01ca".

Next, the data processor 59 of the communication management system 50 searches the contact list management table (see FIG. 10) using the terminal ID "01ab" of the login requesting terminal (i.e., the mobile station 90a) as a search key, and obtains the operating status of the login requesting terminal (i.e., the mobile station 90a) (step S38).

Then, the data transmitter and receiver 51 transmits counterpart terminal status information including the terminal ID "01ab" and the operating status "Online" of the login requesting terminal (i.e., the mobile station 90a) obtained in the step S38 to terminals whose operating status indicates "Online" in the terminal management table (see FIG. 10) among the terminals with the terminal ID extracted in the step S37 (step S39). When transmitting the counterpart terminal status information to the communication terminal 10, the data transmitter and receiver 51 uses the terminal ID and refers to the IP addresses of the terminals, which are managed in the terminal management table illustrated in FIG. 10. Accordingly, the terminal ID "01ab" and the operating status "online" of the login requesting terminal (i.e., the mobile station 90a) can be transmitted to other counterpart terminals that can communicate with the login requesting terminal (i.e., the mobile station 90a) as a candidate counterpart. As a result, the candidate counterpart (such as the communication terminal 10) can display the operating status of the candidate counterparts as illustrated in FIG. 15C (step S40).

Figures 18A, 18B:
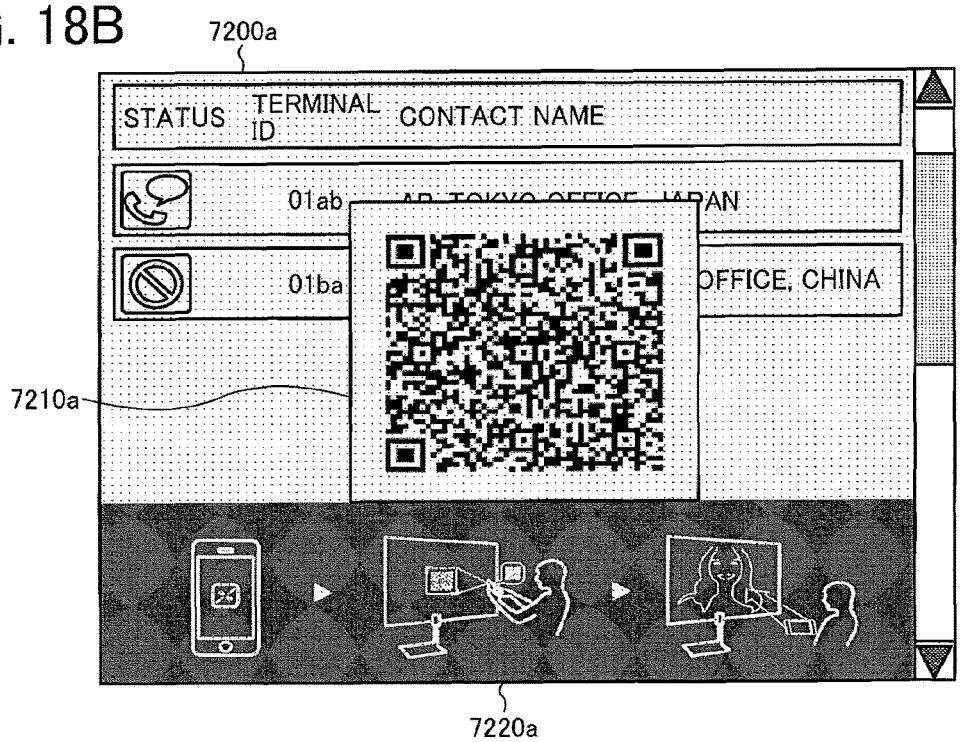
FIG. 18A and FIG. 18B are diagrams each illustrating an example of a screen of a terminal to be switched to, which appears when the telecommunication is to be switched.
Figure 19:
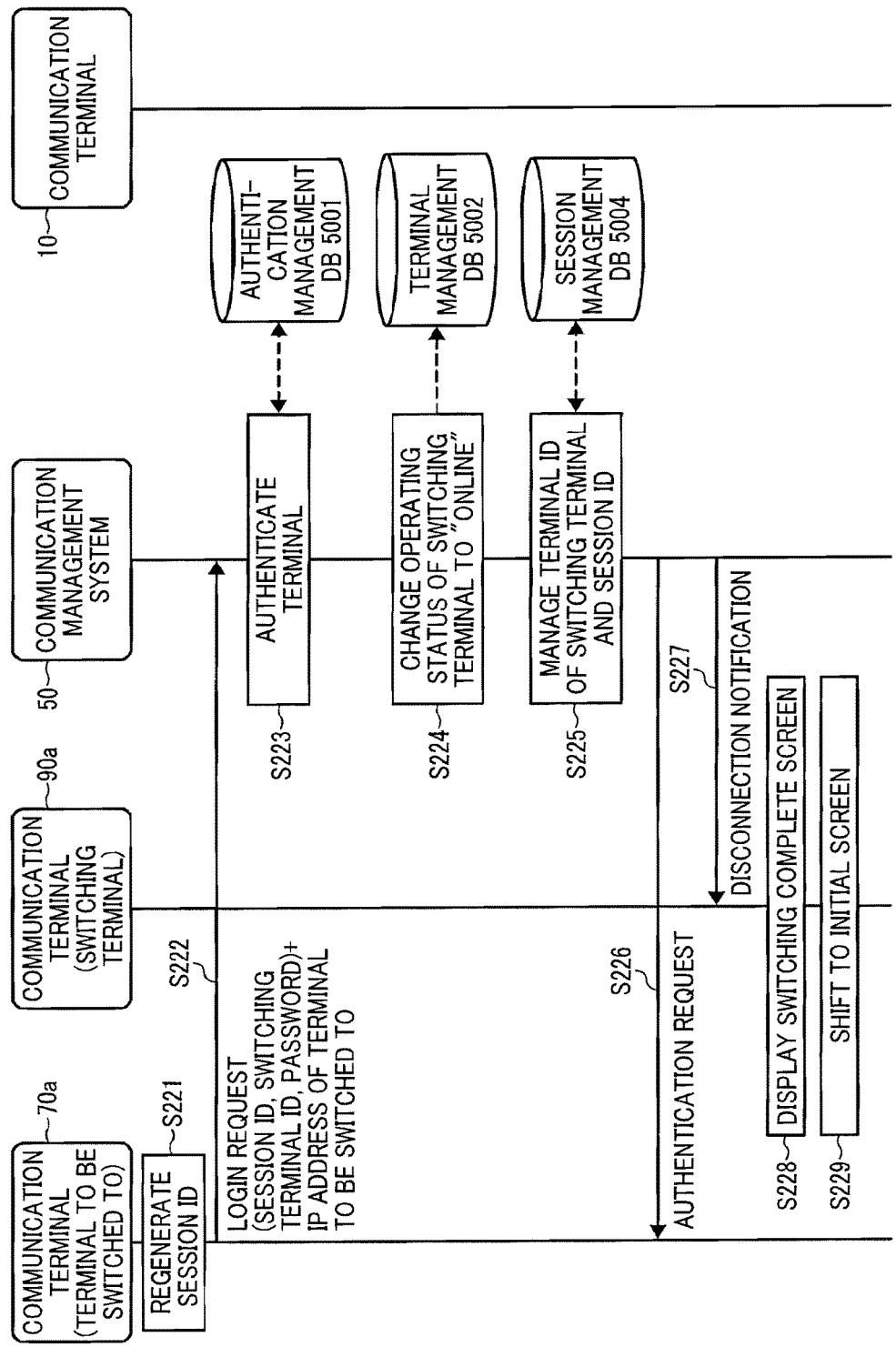
FIG. 19 is a sequence diagram illustrating how a terminal to be switched to makes a switching terminal log in and sends a status change notice on behalf of the switching terminal, according to an embodiment of the present invention.

Next, the processes of switching the telecommunication while the mobile station 90a is communicating with an external terminal (the communication terminal 70d), where the mobile station is the switching terminal and the communication terminal 70a is the terminal to be switched to, are described with reference to FIG. 17A to FIG. 20B. FIG. 19 is a sequence diagram illustrating the processes of switching telecommunication to a terminal to be switched to, while a switching terminal is communicating with a counterpart terminal, according to an embodiment of the present invention. FIG. 17A, FIG. 17B, and FIG. 17C are diagrams illustrating examples of the screen of a mobile station when the mobile station communicates with another terminal, according to the present embodiment. FIG. 18A and FIG. 18B are diagrams each illustrating an example of a screen of a terminal to be switched to, which appears when the telecommunication is to be switched.

Firstly, when the user X selects the counterpart terminal information 9230 on the contact list page 9200 illustrated in FIG. 15B, the acceptance unit 92a accepts the selection of that counterpart terminal (step S141). Then, the display controller 94a controls the display to display a selection screen 9500 as illustrated in FIG. 17A (step S142). On the selection screen 9500, a key 9510 and a key 9520 are displayed. The key 9510 is to be touched when the mobile station 90a is to be used to start communication with the counterpart terminal, and the key 9520 is to be touched when switching from the mobile station 90a to another communication terminal (i.e., the communication terminal 70a in the present embodiment) and preparation for communication are to be performed. Hereinafter, the cases in which the user X touches the key 9520 are described.

Next, in response to an input operation made by the electronic stylus 754 or the like, the display controller 74a of the terminal to be switched to (here, it is the communication terminal 70a) controls the display 753 to display a contact list page 7100a as illustrated in FIG. 18A (step S143). The contact list page 7100a indicates the operating status, the terminal ID, and the name of destination address of a candidate counterpart. The processes of displaying the contact list page 7100a are substantially similar to those described as above with reference to FIG. 14A and FIG. 14B, and only the difference is in that the mobile station 90a is replaced with the communication terminal 70a. For this reason, the description is omitted. Moreover, the contact list page 7100a displays on a lower side of the page a QR code key 7110a to be touched to display a QR code. When the QR code key 7110a is touched, the acceptance unit 72a receives a request for display, and the display controller 74a displays a QR code display screen 7200 as illustrated in FIG. 18B (S144). The QR code display screen 7200a displays a QR code 7210a indicating the terminal ID of the local terminal (i.e., the communication terminal 70a) and explanatory illustrations 7220a indicating how to read the QR code by a typical mobile station.

Subsequently, when the key 9520 as illustrated in FIG. 17A is touched, the acceptance unit 92a receives instructions to display the screen for scanning a QR code, and the display controller 94a makes instructions to switch the display to a QR code scanning screen 9600 as illustrated in FIG. 17B (step S145). On the QR code scanning screen 9600, an image display area 9610 and a cancellation key are displayed. An image viewing through the camera 912 is displayed on the image display area 9610, and the cancellation key 9620 is to be touched to cancel the display of the image display area 9610 and to return to the communication screen 9400. When the switching terminal is made close to a terminal to be switched to and the QR code 7210a illustrated in FIG. 18B is displayed on the image display area 9610 as illustrated in FIG. 17B, the reader 97a reads the QR code (step S146). By so doing, the switching terminal can obtain the terminal ID of the terminal to be switched to.

Subsequently, the data transmitter and receiver 91a of the switching terminal transmits instructions to start telecommunication to the communication management system 50 (step S147). The instructions to start telecommunication indicate that the switching terminal requests a terminal to be switched to to start telecommunication. Such instructions to start telecommunication include the terminal ID of a switching terminal that serves as a starting terminal, the terminal ID of a counterpart terminal, the terminal ID of a terminal to be switched to, and a password. Among these elements of the instructions to start telecommunication, the terminal ID of a switching terminal that serves as a starting terminal is used by a terminal to be switched to in a step S301, as will be described later, to disguise a request to start telecommunication as if the switching terminal is requesting to start telecommunication. The password is the password for the mobile station 90a, and is the password input in the step S21. As a result, the data transmitter and receiver 51 of the communication management system 50 receives the instructions to start telecommunication.

Next, the data transmitter and receiver 51 directly transfers the instructions to start telecommunication received in the step S147 to the terminal to be switched to (step S148). In so doing, the data transmitter and receiver 51 of the communication management system 50 transfers the instructions for participation to the IP address of the terminal to be switched to, which is managed in the terminal management table (see FIG. 10). As a result, the data transmitter and receiver 71a of the terminal to be switched to receives the instructions to start telecommunication. In response, the data transmitter and receiver 71a of the terminal to be switched to transmits to the communication management system 50 consent data indicating consent to the request to start telecommunication (step S149). As a result, the data transmitter and receiver 51 of the communication management system 50 receives the consent data. Such consent data includes the terminal ID of a switching terminal that serves as a starting terminal, and the terminal ID of a counterpart terminal.

Next, the data transmitter and receiver 51 directly transfers the consent data received in the step S149 to the switching terminal (step S150). As a result, the data transmitter and receiver 91a of the switching terminal receives the consent data. As described above, even if the IP address of the terminal to be switched to is not obtained and not available on the switching terminal side, the switching terminal can instruct a terminal to be switched to through the communication management system 50 to request to start telecommunication with a specified counterpart terminal.

Next, how a terminal to be switched to requests the login authentication of a switching terminal on behalf of the switching terminal is described with reference to FIG. 19. FIG. 19 is a sequence diagram illustrating how a terminal to be switched to makes a switching terminal log in and sends an operating status change notice on behalf of the switching terminal, according to the present embodiment.

Firstly, as illustrated in FIG. 19, the terminal to be switched to regenerates session ID on behalf of the switching terminal (step S221). Then, the data transmitter and receiver 71a of the terminal to be switched to, as a switching terminal, transmits login requesting data indicating a login authentication request to the communication management system 50 (step S222). Such login requesting data includes the session ID generated in the step S221, and the terminal ID of the switching terminal obtained in the process of the step S149 and the password. In the transmission in the step S222, the IP address of the terminal to be switched to is also transmitted. As a result, the data transmitter and receiver 51 of the communication management system 50 receives the login requesting information.

Next, the data processor 59 of the communication management system 50 performs terminal authentication by searching the authentication management table of FIG. 9 using the terminal ID and the password included in the login requesting information received via the data transmitter and receiver 51 as search keys, and determining whether the same terminal ID and the same password are managed in the authentication management table of FIG. 9 (step S223). In the present embodiment, it is assumed that the data processor 59 manages the same terminal ID and the same password.

When the data processor 59 manages the same terminal ID and the same password and determines that the login request is sent from an authorized terminal, the data processor 59 changes the operating status field of the terminal ID received in the step S222 as above to "online" in the record of the terminal management table (see FIG. 10), and stores, in the field of received date and time, the date and time at which the login requesting information is received in the step S23 (step S224). Then, the data processor 59 deletes the record generated in the step S26 when the switching terminal logged in, and adds a record generated as the terminal to be switched to has logged in instead of the switching terminal (step S225). At that time, the data processor 59 manages, in the added record, the terminal ID of the switching terminal and the password received in the step S222 (step S225). Accordingly, the communication management system 50 determines that the communication session established due to the login request that the mobile station 90a made in the step S23 is cut off.

Next, the data transmitter and receiver 51 of the communication management system 50 transmits authentication request data indicating the authentication result obtained in the process of the step S223 to the terminal to be switched to that requested the login as above (step S226). Further, the data transmitter and receiver 51 transmits disconnection notification data indicating the disconnection of the communication session to the switching terminal (step S227). As a result, the data transmitter and receiver 91a of the switching terminal receives the disconnection notification data. Then, the display controller 94a of the switching terminal displays a switching complete screen 9700 as illustrated in FIG. 17C (step S228). On the switching complete screen 9700, a comment 9710 and an OK key 9720 are displayed. The comment 9710 indicates that the switching is complete, and the OK key 9720 is to be touched when a user X confirms that the switching is complete. When the OK key 9720 is touched, the acceptance unit 92a receives a touch, and the display controller 94a shifts the screen to a login screen that serves as an initial screen, as illustrated in FIG. 15A (step S229).

Subsequently, the processes of starting telecommunication such as phone conversation, where a terminal to be switched to sends the terminal ID of the switching terminal to the communication management system 50 to disguise a request to start telecommunication as if the switching terminal is requesting to start telecommunication, are described with reference to FIG. 20A to FIG. 22B. In other words, the starting terminal that starts the telecommunication is the communication terminal 70a that is terminal to be switched to, but the terminal ID of the mobile station 90a, which is the switching terminal, is used as the terminal ID of the starting terminal.

Figure 20B:
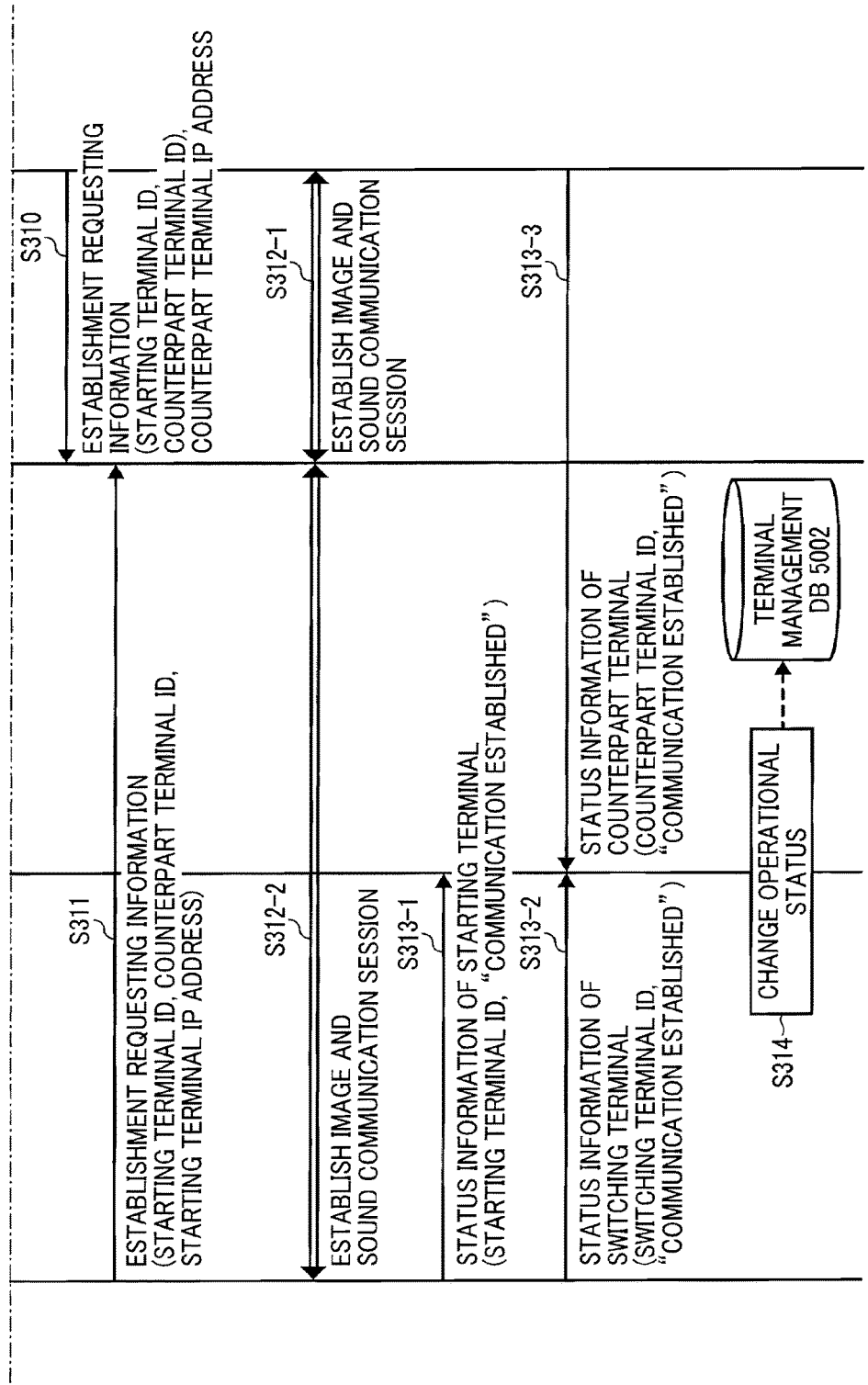
Figure 21A:
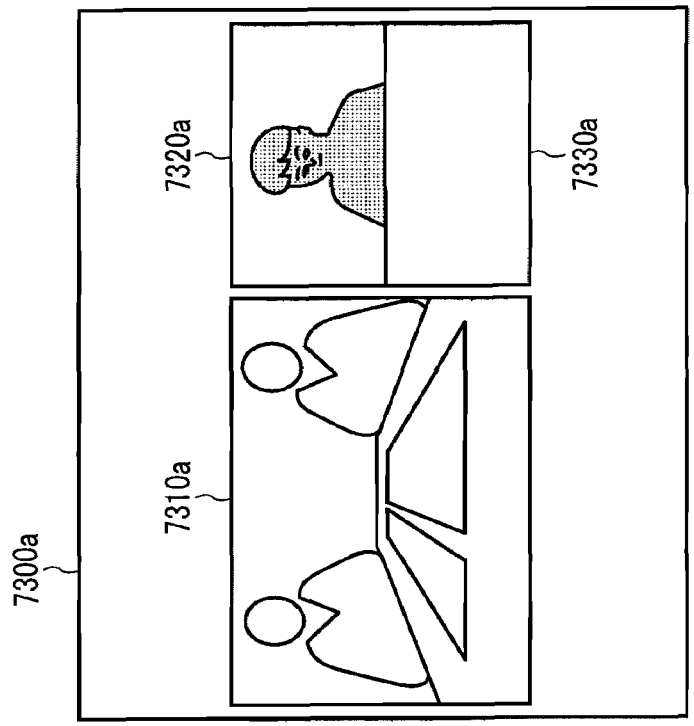
FIG. 21A is a diagram illustrating an example of the screen on the communication terminal 70d side during telecommunication, according an embodiment of the present invention.
Figure 21B:
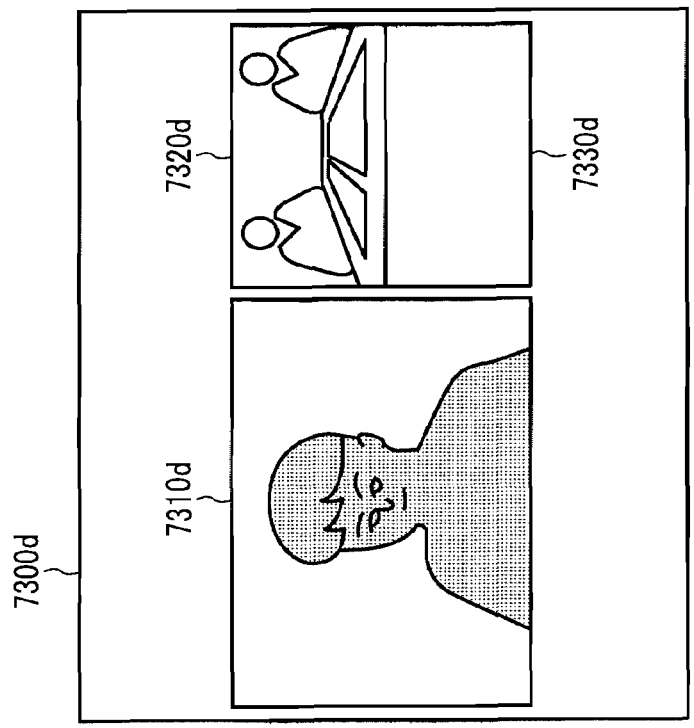
FIG. 21B is a diagram illustrating an example of the screen on the communication terminal 70a side during telecommunication, according an embodiment of the present invention.

FIG. 20A and FIG. 20B are a sequence diagram illustrating how telecommunication starts among communication terminals, according to the present embodiment. FIG. 21A is a diagram illustrating an example of the screen on the communication terminal 70d side during telecommunication, according to the present embodiment. FIG. 21B is a diagram illustrating an example of the screen on the communication terminal 70a side during telecommunication, according to the present embodiment.

Firstly, the starting terminal (i.e., the communication terminal 70a) sends start requesting information, which requests to start telecommunication, to the communication management system 50 (step S301). The start requesting information includes the terminal ID of the starting terminal (i.e., the terminal ID of the mobile station 90a that serves as the switching terminal in the present embodiment) and the terminal ID of the counterpart terminal (i.e., the terminal ID of the communication terminal 70d in the present embodiment). Accordingly, the communication management system 50 receives the start requesting information.

Subsequently, the selection unit 53 of the communication management system 50 selects the nearest relay device based on the IP address of a starting terminal and the IP address of a counterpart terminal (step S302). The IP addresses of terminals are managed in the terminal management table, and the IP addresses of relay devices are stored in the memory 5000 in advance. Next, the generator 54 generates communication information including the IP addresses of relay devices and the communication ID (step S303). The communication ID is information identifying the telecommunication being performed by the starting terminal and the counterpart terminal. Then, the data processor 59 stores the communication ID and the IP addresses of relay devices included in the communication information, and the terminal ID of the starting terminal (i.e., the terminal ID of the switching terminal) and the terminal ID of counterpart terminal which are received in the step S301, in the communication information management table (see FIG. 13), in association with each other (step S304). Subsequently, the data transmitter and receiver 51 sends the start requesting information to the counterpart terminal (i.e., the communication terminal 70d in the present embodiment) (step S305). Note that this start requesting information includes communication information in addition to the terminal ID sent from the starting terminal in the step S301. Accordingly, the data transmitter and receiver 71d of the counterpart terminal receives the start requesting information. Hereinafter, how a permission is given to the telecommunication as a response at a counterpart terminal is described.

The acceptance unit 72d of the counterpart terminal accepts a response from a user Y to start the telecommunication requested in the step S305 (step S306). Then, the data transmitter and receiver 71d transmits affirmative or negative response information to the communication management system 50 (step S307). In this case, the affirmative or negative response information indicates acceptance, and includes the terminal ID of the starting terminal (i.e., the terminal ID of the switching terminal). As a result, the data transmitter and receiver 51 of the communication management system 50 receives the response to the affirmative or negative response information.

Next, the data processor 59 of the communication management system 50 searches the communication information management table (see FIG. 13) using the terminal ID of the starting terminal received in the step S307 as a search key, and reads the relevant communication information (including communication ID and relay device IP address) (step S308). Then, the data transmitter and receiver 51 transmits affirmative or negative response information to the starting terminal. In this case, the affirmative or negative response information includes the communication information read in the step S308. As a result, the data transmitter and receiver 71a of the starting terminal receives the affirmative or negative response information (step S309).

Subsequently, the data transmitter and receiver 71d of the counterpart terminal sends establishment requesting information to the IP address of the relay device included in the communication information received in the step S305 (step S310). The establishment requesting information indicates a request to establish an intercommunication session, and the establishment requesting information includes the terminal ID of the starting terminal and the terminal ID of the counterpart terminal. At the same time, the IP address of the counterpart terminal is also sent. On the other hand, the data transmitter and receiver 71a of the starting terminal sends establishment requesting information to the IP address of the relay device included in the communication information received in the step S309 (step S311). The establishment requesting information indicates a request to establish an intercommunication session, and the establishment requesting information includes the terminal ID of the starting terminal and the terminal ID of the counterpart terminal. At the same time, the IP address of the starting terminal is also sent. Accordingly, a communication session in which the relay device 30 and the starting terminal send and receive image data and audio data to and from each other is established (step S312-1), and a communication session in which the relay device 30 and the counterpart terminal send and receive image data and audio data to and from each other is established (step S312-2).

Then, the data transmitter and receiver 71a of the starting terminal transmits the status information of the starting terminal to the communication management system 50 (step S313-1). The status information includes the terminal ID of the starting terminal and the operating status information (here, it is "communication established"). As a result, the data transmitter and receiver 51 of the communication management system 50 receives the status information of the starting terminal. Further, the data transmitter and receiver 71a of the starting terminal transmits the status information of the switching terminal to the communication management system 50 on behalf of the switching terminal (step S313-2). The status information includes the terminal ID of the switching terminal and the operating status information (here, it is "communication established"). As a result, the data transmitter and receiver 51 of the communication management system 50 receives the status information of the switching terminal. On the other hand, the data transmitter and receiver 71d of the counterpart terminal transmits the status information of the local terminal (i.e., the counterpart terminal) to the communication management system 50 (step S313-3). The status information includes the terminal ID of the counterpart terminal and the operating status information (here, it is "communication established"). As a result, the data transmitter and receiver 51 of the communication management system 50 receives the status information of the counterpart terminal. As described above, each communication terminal notifies the communication management system 50 of the operational status of the own terminal. The terminal to be switched to that serves as a starting terminal also notifies the communication management system 50 of the operating status of the switching terminal. Then, the data processor 59 of the communication management system 50 changes the operating status associated with the terminal ID of the terminal to be switched to that serves as a starting terminal to "communication established" in the terminal management table (see FIG. 10), and changes both the operational status associated with the terminal ID of the switching terminal and the operational status associated with the terminal ID of the counterpart terminal to "communication established" (step S314).

As a result, on the counterpart terminal side, a communication screen 7300d as illustrated in FIG. 21A is displayed. On the communication screen 7300d, a display area 7310d and a display area 7320d are displayed. The display area 7310d indicates an image on the communication terminal 70a side, and the display area 7320d indicates an image (moving images) on the communication terminal 70d (local terminal) side. Further, a display area 7330d indicating the image (moving images) on a third party (participant) side is displayed on the communication screen 7300d. On the other hand, on the starting terminal side, a communication screen 7300a as illustrated in FIG. 21B is displayed. On the communication screen 7300a, a display area 7310a and a display area 7320a are displayed. The display area 7310a indicates an image on the communication terminal 70d side, and the display area 7320a indicates an image (moving images) on the communication terminal 70a (local terminal) side. Further, a display area 7330a indicating the image (moving images) on a third party (participant) side is displayed on the communication screen 7300a.

As described above, the small selection screen 9500 of the mobile station 90a (smartphone) as illustrated in FIG. 17A can be switched to the large communication screen 7300a of the communication terminal 70a (electronic whiteboard) to continue a conference or the like with the communication terminal 70d. Accordingly, the communicating with a remote site can be improved.

Due to the processes performed in the steps S313-1 and S313-2, as illustrated in FIG. 22A, the third terminal (the communication terminal 10 or the like) can display the status of candidate counterparts. In FIG. 22A, the operating status of the terminal to be switched to (i.e., the communication terminal 70a) with the terminal ID "01aa" and the operating status of the switching terminal (i.e., the mobile station 90a) with the terminal ID "01ab" both indicates "communicating (communication established)".

As described above, in the present embodiment, the operating status indicates "communicating" even though the communication session of the switching terminal is disconnected. Accordingly, a user Z of the communication terminal 10 as a third party can join the telecommunication such as a conference without considering whether the counterpart terminal is the switching terminal or the terminal to be switched to. When the configuration according to the present embodiment is not adopted, as illustrated in FIG. 22B, the operating status of the switching terminal (i.e., the mobile station 90a) with the terminal ID "01ab" becomes "offline" due to the disconnected communication session, and participation request for intercommunication cannot be sent to the mobile station 90a.

Next, the processes of terminating the intercommunication are described with reference to FIG. 23. FIG. 23 is a sequence diagram illustrating the processes of terminating intercommunication, according to the present embodiment.

Firstly, the acceptance unit 72a of the terminal to be switched to (here, it is the communication terminal 70a) receives an input operation made by an user X using the electronic stylus 754 or the like, and accepts an exit from the communication (step S401). Then, the data transmitter and receiver 71a transmits disconnection requesting data, which requests to disconnect the communication session, to the relay device 30 (step S402). Such disconnection requesting data includes the terminal ID of a terminal to be switched to. Accordingly, the data transmitter and receiver 31 of the relay device 30 receives the disconnection requesting data. Further, the data transmitter and receiver 71a of the terminal to be switched to transmits exit requesting data, which requests to exit from the intercommunication, to the communication management system 50 (step S403). Such exit requesting data includes the terminal ID of a terminal to be switched to. As a result, the data transmitter and receiver 51 of the communication management system 50 receives the exit requesting data. Then, the data processor 59 of the communication management system 50 deletes the terminal ID of the terminal to be switched to in the communication information management table (see FIG. 13) (step S404).

Further, in order to change the management of the operating status of the terminal to be switched to, the data transmitter and receiver 71a of the terminal to be switched to transmits the status data, indicating the operating status of the terminal to be switched to, to the communication management system 50 (step S405). The status data includes the terminal ID of the terminal to be switched to, and the operating status data indicating the operating status "online". As a result, the data transmitter and receiver 51 of the communication management system 50 receives the status information of the terminal to be switched to. Then, the data processor 59 of the communication management system 50 uses the terminal ID of the terminal to be switched to, and changes the operating status of the terminal to be switched to in the terminal management table (see FIG. 10) to "online" (step S406).

Then, in order to change the management of the operating status of the switching terminal on behalf of the switching terminal, the data transmitter and receiver 71a of the terminal to be switched to transmits the status data, indicating the operating status of the switching terminal, to the communication management system 50 (step S407). The status data includes the terminal ID of the switching terminal, and the operating status data indicating the operating status "offline". As a result, the data transmitter and receiver 51 of the communication management system 50 receives the status information of the switching terminal. Then, the data processor 59 of the communication management system 50 uses the terminal ID of the switching terminal, and changes the operating status of the switching terminal to in the terminal management table (see FIG. 10) to "offline" (step S408).

Further, in order to change the management of the communication session of the switching terminal to "disconnected" on behalf of the switching terminal, the data transmitter and receiver 71a of the terminal to be switched to transmits the disconnection requesting data to the communication management system 50 (step S409). Such disconnection requesting data includes the terminal ID of a switching terminal. As a result, the data transmitter and receiver 51 of the communication management system 50 receives the disconnection requesting data. Then, the data processor 59 of the communication management system 50 uses the terminal ID of the switching terminal, and deletes the record of the terminal ID of the switching terminal in the session management table (see FIG. 12) (step S410). Accordingly, the communication management system 50 determines that the communication sessions of the terminal to be switched to and the switching terminal are "disconnected" and the operating status of the terminal to be switched to and the switching terminal is "offline".

As described above, according to the present embodiment, the terminal to be switched to (i.e., the communication terminal 70a) provides the switching terminal (i.e., the mobile station 90a) with the terminal ID of the local terminal (i.e., the communication terminal 70a) (as an example of local terminal identification information) through a QR code (see S144), and receives the terminal ID of the switching terminal (as an example of the external terminal identification information) sent to the provided terminal ID from the switching terminal through the communication management system 50 (see S148). Subsequently, the terminal to be switched to sends the terminal ID of the switching terminal, to the communication management system 50 to request a counterpart terminal to start the telecommunication (see S301). Here, the terminal ID of the switching terminal is sent as the terminal ID of the starting terminal (an example of the starting terminal identification information) instead of the terminal ID of the local terminal (i.e., the communication terminal 70a). As described above, when a user X wishes to request telecommunication after the counterpart terminal is selected or some equivalent operations are made at a handy mobile station, the user X requests to start the telecommunication through the communication terminal 70a where the display screen is relatively large. By so doing, both handy operation and improvement in communication quality can be satisfied.

While the switching terminal (i.e., the mobile station 90a) can start the communication with a counterpart terminal on its own, the switching terminal can also serve as a handy remote control for the terminal to be switched to (i.e., the communication terminal 70a).

The terminal to be switched to (i.e., the communication terminal 70a) transmits to the communication management system 50 first status information indicating that the local terminal (i.e., the communication terminal 70a) is "communicating" (see S313-1) and second status information indicating that the switching terminal is "communicating" (see S313-2). Accordingly, a user Z of the communication terminal 10 as a third party can join the telecommunication such as a conference without considering whether the counterpart terminal is the switching terminal or the terminal to be switched to.

In the embodiment described above, the terminal ID of the terminal to be switched to was provided to the switching terminal using a QR code. However, no limitation is intended therein. For example, the terminal ID of the terminal to be switched to may be provided by short-range radio communication using the short-range communication units 78a and 98a or by wire communication using, for example, a USB cable.

In the step S307 as described above, the affirmative or negative response information includes the terminal ID of a starting terminal. However, no limitation is intended therein. For example, the affirmative or negative response information may include the communication information instead of the terminal ID of the starting terminal. In this case, the data processor 59 of the communication management system 50 searches the communication information management table (see FIG. 13) using the communication information as a search key, to read the terminal ID of the corresponding starting terminal.

The case of a video conference terminal or an electronic whiteboard has been described as an example of a communication terminal in the above-described embodiment. However, no limitation is intended therein. The communication terminal may be an Internet protocol (IP) phone, an Internet phone, a car navigation terminal, or a surveillance camera. In alternative to the video conference terminal and the electronic whiteboard, any other type of office equipment may be used such as a printer, facsimile, and multifunction peripheral (MFP). The communication terminal may be implemented as medical equipment, such as an endoscope, a Computed Tomography (CT) scan, and radiotherapy equipment.

Further, in alternative to the smart phone, any other mobile terminal may be used, such as a portable phone, digital camera, portable game machine, IC card, or wearable computer. A wearable computer includes, for example, a smart watch and a head-mounted display.

In addition, although image data and audio data are described as examples of content data in the above-described embodiment, the content data is not limited to these items of data, and the content data may be touch data. In this case, a feeling obtained by a user's contact at one terminal side is transmitted to the other terminal side. Further, the content data may be smell data. In this case, a smell at one terminal side is transmitted to the other terminal side. Based on the received data of smell, a smell generator, which may be incorporated in or connected to the other terminal, may generate a smell based on such received data. The content data may be at least one of image data, audio data, touch data, and smell data.

Although the case in which a video conference is held by the communication system 1 has been described in the above-described embodiment, the embodiment is not limited to this case. The communication system 1 may be used in meetings, general conversation between family members or friends, or one-way presentation of information.

In the above-described embodiments, a request for storing processes or a request for reading processes are transmitted or received by short-range radio communication such as near-field communication (NFC). However, such requests may be transmitted or received by ultrasonic communication.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A communication terminal, comprising:
   circuitry to output first terminal identification information identifying a destination address of the communication terminal;
   a receiver to receive, from a communication management system, second terminal identification information identifying an external communication terminal, wherein the communication management system
   (1) previously obtains both the second terminal identification information and the destination address together in a communication from the external communication terminal, the external communication terminal having obtained the destination address, which was output by the circuitry, prior to sending the destination address in the communication to the communication management system, and
   (2) sends the obtained second terminal identification information to the obtained destination address; and
   a transmitter to transmit, from the communication terminal to the communication management system, when requesting to start communication between the communication terminal and a counterpart communication terminal selected by the external communication terminal, data that includes the received second terminal identification information identifying the external communication terminal, and identifies the external communication terminal as a start requesting terminal, instead of identifying the communication terminal as the start requesting terminal.

2. The communication terminal according to claim 1, wherein
   the transmitter transmits counterpart communication terminal identification information identifying the selected counterpart communication terminal to the communication management system when the communication with the selected counterpart communication terminal is requested.

3. The communication terminal according to claim 1, wherein
   the transmitter transmits, to the communication management system, first status information indicating that the communication terminal is communicating, and second status information indicating that the external communication terminal is communicating.

4. The communication terminal according to claim 3, wherein
in response to receiving an instruction for ending the communication with the counterpart communication terminal, the transmitter transmits, to the communication management system, a communication exit request requesting the communication terminal to exit the communication and a disconnection request requesting to disconnect communication of the external communication terminal with the communication terminal.

5. The communication terminal according to claim 4, wherein
the transmitter further transmits, to the communication management system, third status information indicating that the communication terminal is available for communication, and fourth status information indicating that the external communication terminal is disconnected from a communication session established between the external communication terminal and the communication terminal.

6. The communication terminal according to claim 1, wherein
the circuitry controls a display to display a bar code as the first terminal identification information identifying the destination address of the communication terminal.

7. The communication terminal according to claim 1, wherein
the circuitry controls the transmitter to transmit the first terminal identification information identifying the destination address to the external communication terminal by short-range radio communication.

8. The communication terminal according to claim 1, wherein
the receiver receives authentication information of the external communication terminal sent from the external communication terminal together with the second terminal identification information through the communication management system, and
the transmitter transmits the authentication information together with the second terminal identification information to the communication management system.

9. A communication system, comprising:
the communication terminal according to claim 1; and
the communication management system that manages a communication status of the communication terminal.

10. The communication system according to claim 9, further comprising:
the external communication terminal, which is configured to obtain the first terminal identification information identifying the destination address and being output from the communication terminal, and to transmit the second terminal identification information and the destination address in the communication to the communication management system.

11. A method of communication, the method comprising:
outputting first terminal identification information identifying a destination address of a communication terminal;
receiving, from a communication management system, second terminal identification information identifying an external communication terminal, wherein the communication management system
(1) previously obtains both the second terminal identification information and the destination address together in a communication from the external communication terminal, the external communication terminal having obtained the destination address, which was output by the circuitry, prior to sending the destination address in the communication to the communication management system; and
(2) sends the obtained second terminal identification information to the obtained destination address; and
transmitting, from the communication terminal to the communication management system, when requesting to start communication between the communication terminal and a counterpart communication terminal selected by the external communication terminal, data that includes the received second terminal identification information identifying the external communication terminal, and identifies the external communication terminal as a start requesting terminal, instead of identifying the communication terminal as the start requesting terminal.

12. The method according to claim 11, wherein
the outputting includes transmitting counterpart terminal identification information identifying the selected counterpart communication terminal to the communication management system when the communication with the selected counterpart communication terminal is requested.

13. The method according to claim 11, wherein
the transmitting includes transmitting, to the communication management system, first status information indicating that the communication terminal is communicating, and second status information indicating that the external communication terminal is communicating.

14. The method according to claim 13, wherein
in response to receiving an instruction for ending the communication with the counterpart communication terminal, the transmitting includes transmitting, to the communication management system, a communication exit request requesting the communication terminal to exit the communication and a disconnection request requesting to disconnect communication of the external communication terminal with the communication terminal.

15. The method according to claim 14, wherein
the transmitting further includes transmitting, to the communication management system, third status information indicating that the communication terminal is available for communication, and fourth status information indicating that the external communication terminal is disconnected from a communication session established between the external communication terminal and the communication terminal.

16. The method according to claim 11, wherein
the outputting includes controlling a display to display a bar code as the first terminal identification information identifying the destination address of the communication terminal.

17. The method according to claim 11, wherein
the outputting includes controlling the transmitting to transmit the first terminal identification information identifying the destination address to the external communication terminal by short-range radio communication.

18. The method according to claim 11, wherein
the receiving includes receiving authentication information of the external communication terminal sent from the external communication terminal together with the second terminal identification information through the communication management system, and the transmitting includes transmitting the authentication information together with the second terminal identification information to the communication management system.

19. A non-transitory computer-readable recording medium storing a program for causing a computer to execute a method, the method comprising:

outputting first terminal identification information identifying a destination address of a communication terminal;

receiving, from a communication management system, second terminal identification information identifying an external communication terminal, wherein the communication management system (1) previously obtains both the second terminal identification information and the destination address together in a communication from the external communication terminal, the external communication terminal having obtained the destination address, which was output by the circuitry, prior to sending the destination address in the communication to the communication management system, and (2) sends the obtained second terminal identification information to the obtained destination address; and transmitting, from the communication terminal to the communication management system, when requesting to start communication between the communication terminal and a counterpart communication terminal selected by the external communication terminal, data that includes the received second terminal identification information identifying the external communication terminal, and identifies the external communication terminal as a start requesting terminal, instead of identifying the communication terminal as the start requesting terminal.

20. The method according to claim 19, wherein the transmitting includes transmitting counterpart terminal identification information identifying the selected counterpart communication terminal to the communication management system when the communication with the selected counterpart communication terminal is requested.

* * * * *